US009438898B2

(12) United States Patent
Xiu et al.

(10) Patent No.: US 9,438,898 B2
(45) Date of Patent: Sep. 6, 2016

(54) REFERENCE PICTURE LISTS MODIFICATION

(71) Applicant: VID SCALE, INC., Wilmington, DE (US)

(72) Inventors: Xiaoyu Xiu, San Diego, CA (US); Yong He, San Diego, CA (US); Yan Ye, San Diego, CA (US); Yuwen He, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 31 days.

(21) Appl. No.: 14/019,871

(22) Filed: Sep. 6, 2013

(65) Prior Publication Data
US 2014/0072031 A1 Mar. 13, 2014

Related U.S. Application Data

(60) Provisional application No. 61/698,224, filed on Sep. 7, 2012, provisional application No. 61/732,021, filed on Nov. 30, 2012, provisional application No. 61/762,520, filed on Feb. 8, 2013.

(51) Int. Cl.
*H04N 7/26* (2006.01)
*H04N 7/12* (2006.01)
(Continued)

(52) U.S. Cl.
CPC ...... *H04N 19/00024* (2013.01); *H04N 19/172* (2014.11); *H04N 19/30* (2014.11);
(Continued)

(58) Field of Classification Search
CPC ................ H04N 19/00024; H04N 19/172; H04N 19/597; H04N 19/503; H04N 19/70; H04N 19/30; H04N 19/105

USPC ...................................................... 375/240.02
See application file for complete search history.

(56) References Cited

U.S. PATENT DOCUMENTS

2005/0123056 A1* 6/2005 Wang et al. ............. 375/240.25
2007/0019724 A1* 1/2007 Tourapis et al. ......... 375/240.12
2008/0117985 A1* 5/2008 Chen et al. .............. 375/240.26

FOREIGN PATENT DOCUMENTS

WO WO 2008/123917 A2 10/2008

OTHER PUBLICATIONS

Tourapis et al. "H.264/14496-10 AVC Reference Software Manual (revised for JM 18.0)", Joint Video Team (JVT) of ISO/IEC MPEG & ITU-T VCEG (ISO/IEC JTC1/SC29/WG11 and ITU-T SG16 Q.6), 31st Meeting: London, UK, Jun. 28-Jul. 3, 2009, 97 pages.

(Continued)

*Primary Examiner* — Hee-Yong Kim
(74) *Attorney, Agent, or Firm* — Condo Roccia Koptiw LLP

(57) ABSTRACT

Systems, methods, and instrumentalities are disclosed relating to modifications to reference picture lists used for multiple layer video coding. A bitstream that may include a reference picture list of a slice may be received. An indication to reposition a reference picture within the reference picture list from a first position to a second position may be received. An indication to insert a reference picture within the reference picture list at a position may be received. The reference picture may be repositioned and/or inserted in the reference picture list in response to receiving the indication. A reference picture previously associated with the position may be shifted in the reference picture list according to the indication to reposition and/or insert the reference picture, although an indication to reposition the reference picture previously associated with the position may not be received. The slice may be decoded using the reference picture list.

18 Claims, 15 Drawing Sheets

(51) Int. Cl.

| | | |
|---|---|---|
| *H04N 11/04* | (2006.01) | |
| *H04B 1/66* | (2006.01) | |
| *H04N 19/105* | (2014.01) | |
| *H04N 19/172* | (2014.01) | |
| *H04N 19/30* | (2014.01) | |
| *H04N 19/597* | (2014.01) | |
| *H04N 19/503* | (2014.01) | |
| *H04N 19/70* | (2014.01) | |
| *H04N 19/58* | (2014.01) | |

(52) U.S. Cl.
CPC ........... *H04N 19/503* (2014.11); *H04N 19/58* (2014.11); *H04N 19/597* (2014.11); *H04N 19/70* (2014.11); *H04N 19/105* (2014.11)

(56) References Cited

OTHER PUBLICATIONS

Bross et al., "High Efficiency Video Coding (HEVC) Text Specification Draft 8", JCTVC-J1003, Joint Collaborative Team on Video Coding (JCT-VC) of ITU-T SG16 WP3 and ISO/IEC JTC1/SC29/WG11 10th Meeting: Stockholm, SE, Jul. 11-20, 2012, 294 pages.

Chen et al., "3D-HEVC HLS: Reference Picture List Modification", Qualcomm Incorporated, International Organization for Standardization, ISO/IEC JTC1/SC29/WG11, Coding of Moving Pictures and Audio, Geneva, Switzerland, Apr.-May 2012, 9 pages.

Choi et al., "3D-HEVC HLS: On Reference List", Samsung Electronics Co., Ltd., International Organisation for Standardisation, ISO/IEC JTC1/SC29/WG11, Geneva, Switzerland, May 2012, 8 pages.

ITU-T, "Advanced Video Coding for Generic Audiovisual Services", ITU-T Recommendation H.264, Nov. 2007, 564 pages.

Ramasubramonian et al., "AHG13: On Reference Picture List Modification", Qualcomm Incorporated, JCTVC-J0119, Joint Collaborative Team on Video Coding (JCT-VC) of ITU-T SG16 WP3 and ISO/IEC JTC1/SC29/WG11, 10th Meeting: Stockholm, SE, Jul. 11-20, 2012, 6 pages.

Richardson, Iain G., "Frame and Picture Management", IEEE, Jan. 2004, 7 pages.

SMPTE, "VC-1 Compressed Video Bitstream Format and Decoding Process—Amendment 2", Amendment 2:2011 to SMPTE ST 421M:2006, New York, Mar. 30, 2011, 5 pages.

\* cited by examiner

REFERENCE PICTURE LISTS MODIFICATION

CROSS-REFERENCE TO RELATED APPLICATIONS

This application claims the benefit of U.S. Provisional Patent Application No. 61/698,224, filed Sep. 7, 2012, U.S. Provisional Patent Application No. 61/732,021, filed Nov. 30, 2012, and U.S. Provisional Patent Application No. 61/762,520, filed Feb. 8, 2013, the contents of which are hereby incorporated by reference herein.

BACKGROUND

Video coding systems may be used to compress digital video signals to reduce the storage need and/or transmission bandwidth of such signals. Among the types of video coding systems, such as block-based, wavelet-based, and object-based systems, block-based hybrid video coding systems may be widely used and deployed. Examples of block-based video coding systems include, but are not limited to those described in international video coding standards such as the MPEG1/2/4 part 2, H.264/MPEG-4 part 10 AVC and VC-1 standards.

SUMMARY

Systems, methods, and instrumentalities are disclosed relating to modifications to reference picture lists used for multiple layer video coding. A device, such as a decoder, for example, may perform the following. A bitstream may be received. The bitstream may be a scalable bitstream. The bitstream may include one or more reference picture lists of a slice (e.g., a P slice, a B slice, or the like) of the bitstream. A reference picture list may include a plurality of reference pictures. The reference pictures may include temporal reference pictures and/or inter-layer reference pictures for the slice. The reference picture list may include temporal reference pictures positioned before inter-layer reference pictures.

An indication may be received. The indication to reposition the reference picture may be a variable (e.g., a flag) in a slice header of the slice. The indication may indicate that a reference picture of the plurality of reference pictures may be repositioned within the reference picture list from a first position to a second position. The first position may be before or after the second position in the reference picture list.

The reference picture may be repositioned within the reference picture list from the first position to the second position, for example, in response to receiving the indication. A reference picture previously associated with the second position may be shifted in the reference picture list according to the indication to reposition the reference picture. An indication to reposition the reference picture previously associated with the second position may not be received. The reference picture may be an inter-layer reference picture. The inter-layer reference picture may be repositioned in front of a temporal reference picture within the reference picture list. The slice may be decoded using the reference picture list.

The reference picture previously associated with the second position and reference pictures previously associated with positions between the first position and the second position may be shifted in the reference picture list according to the indication to reposition the reference picture, for example, if there are one or more reference pictures between the first position and the second position. Indications may not be received for the reference picture previously associated with the second position or the reference pictures previously associated with positions between the first position and the second position.

A sub-set of the plurality of reference pictures within the reference picture list may be repositioned according to the indication to reposition the reference picture. The sub-set of the plurality of reference pictures may include the reference picture and the reference picture may be repositioned from the first position to the second position. The remaining reference pictures of the sub-set of reference pictures may be repositioned to positions after the second position. One or more reference pictures not associated with the sub-set of the plurality of reference pictures may be shifted within the reference picture list according to the indication to repositioning the reference picture. The sub-set of the plurality of reference pictures may be inter-layer reference pictures. The inter-layer reference pictures may be repositioned in front of a temporal reference picture within the reference picture list, for example, without receiving an indication to reposition the temporal reference picture.

A bitstream may be received. The bitstream may be a scalable bitstream. The bitstream may include one or more reference picture lists and/or one or more reference picture sets. A reference picture list may include a plurality of temporal reference pictures, for example, for temporal prediction of a slice (e.g., a P slice, a B slice, or the like). A reference picture set may include a plurality of inter-layer reference pictures, for example, for inter-layer prediction of the slice.

An indication to insert a reference picture of the reference picture set at a position within a reference picture list may be received. The reference picture may be inserted into the reference picture list at the position. A reference picture previously associated with the position may be shifted in the reference picture list according to the indication to insert the reference picture. An indication to reposition the reference picture previously associated with the position of the reference picture list may not be received. The reference picture may be an inter-layer reference picture. The reference picture previously associated with the position of the reference picture list may be a temporal reference picture. A size of the reference picture list may increase upon the insertion of the reference picture at the position within the reference picture list. The slice of the bitstream may be decoded using the reference picture list.

A plurality of reference pictures from the reference picture set may be inserted into the reference picture list in accordance with the indication to insert the reference picture. The plurality of reference pictures may include the reference picture. The reference picture may be inserted at the position within the reference picture list, and for example, the remaining reference pictures of the plurality of reference pictures may be included after the position. The plurality of reference pictures from the reference picture set may be inter-layer reference pictures.

A device (e.g., an encoder) may perform a first encoding of a bitstream using a first reference picture list and collect encoding statistics while performing the first encoding. The device may reorder one or more reference pictures of the reference picture list based on the collected encoding statistics to create a second reference picture list. The device may perform a second encoding the bitstream using the second reference picture list. The reordering of the one or more reference pictures may be based on usage of the one or more reference picture in the reference picture list during the first encoding. The reordering of the one or more reference pictures may be based on motion-compensated distortion between an original video block of the video stream and one or more prediction blocks of the bitstream. The device may transmit the bitstream with the second reference picture list to another device (e.g., a decoder).

DETAILED DESCRIPTION

An inter-layer may include a processed base layer and/or an upsampled base layer. For example, an inter-layer, a processed base layer, and/or an upsampled base layer may be used interchangeably. An inter-layer reference picture, a processed base layer reference picture, and/or an upsampled base layer reference picture may be used interchangeably. An inter-layer video block, a processed base layer video block, and/or an upsampled base layer video block may be used interchangeably. There may be a temporal relationship between an enhancement layer, an inter-layer, and a base layer. For example, a video block and/or a picture of an enhancement layer may be associated with a temporally corresponding video block and/or picture of the inter-layer and/or the base layer.

A slice may include a picture and/or a video block. A video block may be an operational unit at any tier and/or level of the bitstream. For example, a video block may refer to an operational unit at the picture level, the block level, the slice level, etc. A video block may be of any size. For example, a video block may refer to a video block of any size, such as a 4×4 video block, an 8×8 video block, a 16×16 video block, or the like. For example, a video block may refer to a prediction unit (PU), a smallest PU (SPU), or the like. A PU may be the video block unit used for carrying the information related to motion prediction, for example, including a reference picture index and MV. One PU may include one or more smallest PUs (SPUs). Although SPUs in the same PU may refer to the same reference picture with identical MVs, storing motion information in units of the SPUs may facilitate motion information retrieval in some implementations. Motion information (e.g., a MV field) may be stored in units of the video block, such as the PU, the SPU, or the like. Although examples described herein may be described with reference to pictures, slices, video blocks and/or PUs, any operational unit of any size (e.g., a picture, a video block, a PU, a SPU, or the like) may be used.

Figure 1:
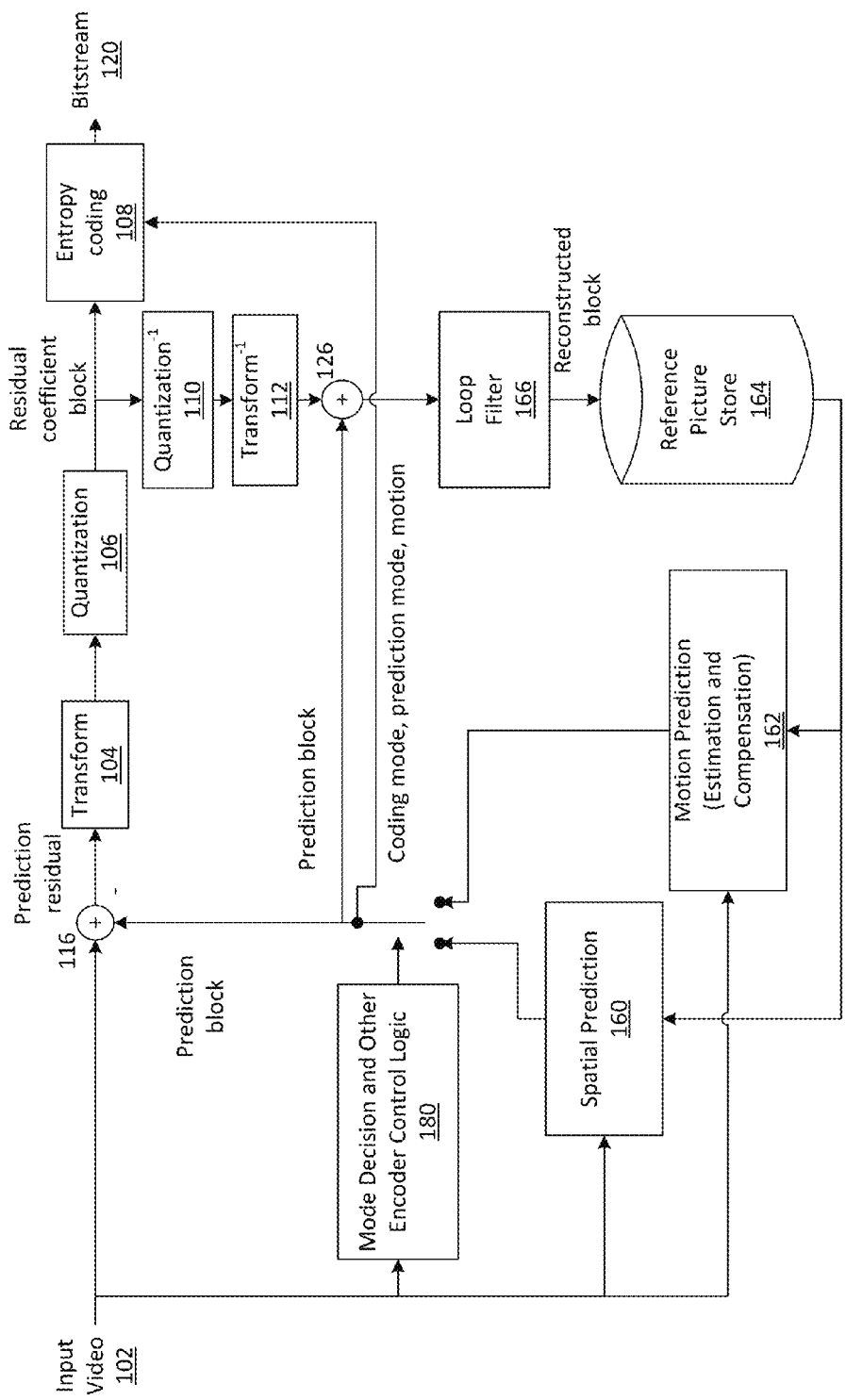
FIG. 1 is a diagram illustrating an example of a block-based video encoder.

FIG. 1 is a diagram illustrating an example of a block-based hybrid video encoding system. The input video signal 102 may be processed block by block. A video block unit may include 16×16 pixels. Such a block unit may be referred to as a macroblock (MB). In High Efficiency Video Coding (HEVC), extended block sizes (e.g., which may be referred to as a "coding unit" or CU) may be used to efficiently compress high resolution (e.g., 1080p and beyond) video signals. In HEVC, a CU may be up to 64×64 pixels. A CU may be partitioned into prediction units (PUs), for which separate prediction methods may be applied.

For an input video block 102 (e.g., a MB or a CU), spatial prediction 160 and/or temporal prediction 162 may be performed. Spatial prediction (e.g., intra prediction) may use pixels from already coded neighboring blocks in the same video picture/slice to predict the current video block. Spatial prediction may reduce spatial redundancy inherent in the video signal. Temporal prediction (e.g., inter prediction or motion compensated prediction) may use pixels from already coded video pictures (e.g., which may be referred to as reference pictures) to predict the current video block. Temporal prediction may reduce temporal redundancy inherent in the video signal. A temporal prediction signal for a given video block may be signaled by one or more motion vectors. A motion vector may indicate the amount and/or the direction of motion between the current block and its prediction block in the reference picture.

A reference picture index may be provided for a video block. For example, if multiple reference pictures are supported (e.g., as may be the case for H.264/AVC and/or HEVC), then for a video block, its reference picture index may be sent. The reference index may be used to identify from which reference picture in the reference picture store 164 (e.g., which may be referred to as a decoded picture buffer (DPB)) the temporal prediction signal comes. The mode decision block 180 in the encoder may select a prediction mode, for example, after spatial and/or temporal prediction.

The prediction block may be subtracted from the current video block 116. The prediction residual may be transformed 104 and/or quantized 106. The quantized residual coefficients may be inverse quantized 110 and/or inverse transformed 112 to form the reconstructed residual. The reconstructed residual may be added to the prediction block 126 to form a reconstructed video block. In-loop filtering such as, but not limited to a deblocking filter, a Sample Adaptive Offset, and/or Adaptive Loop Filters may be applied by loop filter 166 on the reconstructed video block before it is put in the reference picture store 164 and/or used to code future video blocks. To form the output video bitstream 120, a coding mode (e.g., inter coding or intra coding), prediction mode information, motion information, and/or quantized residual coefficients may be sent to the entropy coding unit 108 to be compressed and packed to form the bitstream.

Figure 2:
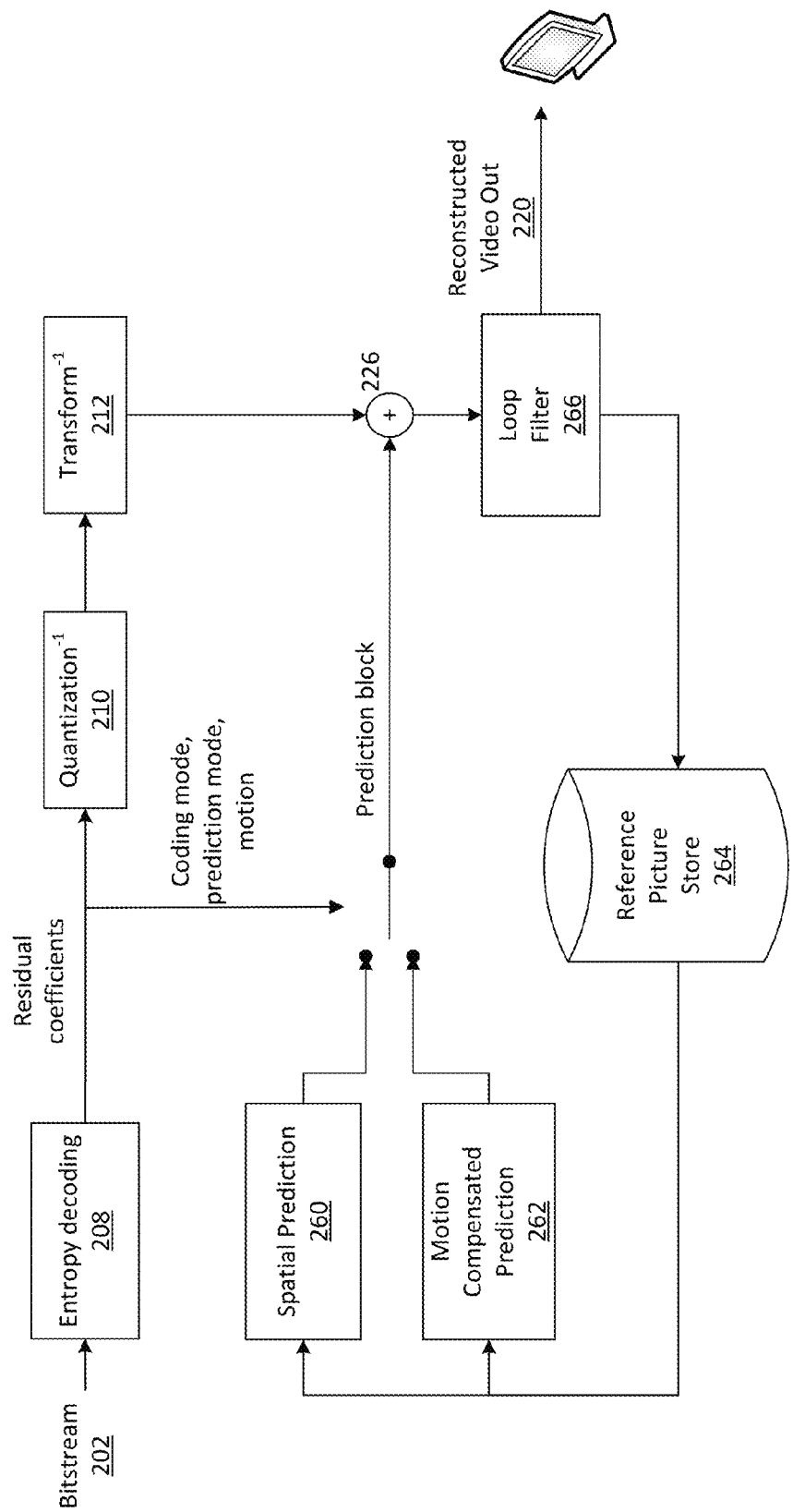
FIG. 2 is a diagram illustrating an example of a block-based video decoder.

FIG. 2 is a block diagram illustrating an example of a block-based video decoder. The video bitstream 202 may be unpacked and entropy decoded at entropy decoding unit 208. The coding mode and prediction information may be sent to the spatial prediction unit 260 (e.g., if intra coded) and/or the temporal prediction unit 262 (e.g., if inter coded) to form the prediction block. If inter coded, the prediction information may comprise prediction block sizes, one or more motion vectors (e.g., which may indicate direction and amount of motion), and/or one or more reference indices (e.g., which may indicate from which reference picture the prediction signal is to be obtained). Motion compensated prediction may be applied by the temporal prediction unit 262 to form the temporal prediction block. The residual transform coefficients may be sent to inverse quantization unit 210 and inverse transform unit 212 to reconstruct the residual block. The prediction block and the residual block may be added together at 226. The reconstructed block may go through in-loop filtering before it is stored in reference picture store 264. The reconstructed video in reference picture store may be sent out to drive a display device, as well as used to predict future video blocks.

A single layer video encoder may take a single video sequence input and generate a single compressed bit stream transmitted to the single layer decoder. A video codec may be designed for digital video services (e.g., such as but not limited to sending TV signals over satellite, cable, and/or terrestrial transmission channels). With video centric applications deployed in heterogeneous environments, multi-layer video coding technologies may be developed as an extension of the video coding standards to enable various applications. For example, scalable video coding technologies may be designed to handle more than one video layer, where a layer (e.g., each layer) may be decoded to reconstruct a video signal of a particular spatial resolution, temporal resolution, fidelity, and/or view.

Figure 3:
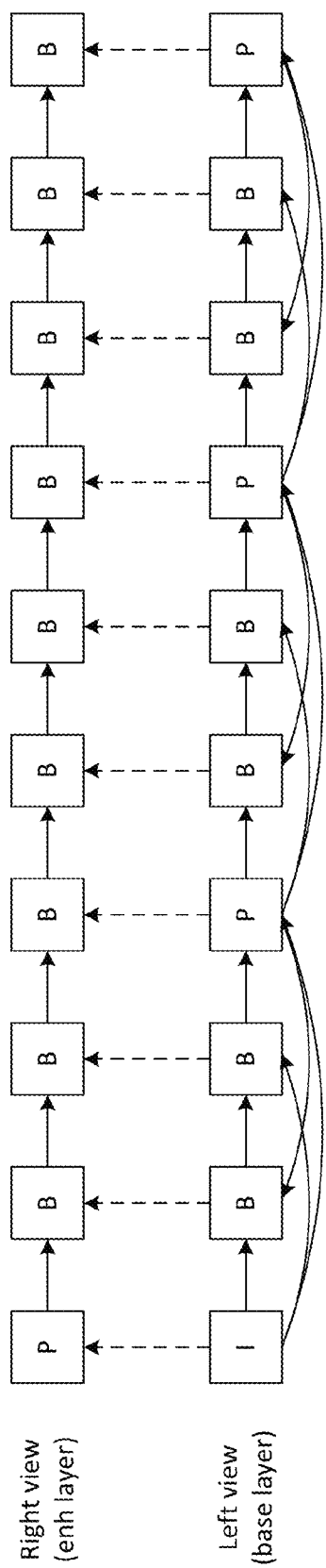
FIG. 3 is a diagram illustrating an example of a two view video coding structure.

FIG. 3 is a diagram illustrating an example of a two view video coding structure. FIG. 3 illustrates an example of temporal and inter-dimension/layer prediction for two-view video coding. Inter-layer prediction (e.g., illustrated by dashed lines) may be used to improve the compression efficiency by exploring the correlation among multiple video layers. For example, the inter-layer prediction may be performed between two views.

Signaling and/or construction of one or more reference pictures used for inter-layer prediction and/or temporal prediction may be described herein. Signaling and/or construction of a current reference picture list (e.g., in HEVC) may be described herein. Signaling related to reference picture list construction and/or modification for mixed temporal and inter-layer prediction may be described herein. The terms "temporal prediction," "motion prediction," "motion compensated prediction," and "inter prediction" may be used interchangeably herein. The terms "inter-view" and "inter-layer" may be used interchangeably herein. The terms "reference picture store" and "decoded picture buffer" or "DPB" may be used interchangeably herein.

A reference picture list may include one or more reference pictures that may be used for temporal motion compensated prediction of a P and/or B slice (e.g., in HEVC). For the decoding process of a P slice, there may be one reference picture list (e.g., list0). For the decoding process of a B slice, there may be two reference picture lists (e.g., list0 and list 1). A default reference picture list may be constructed based on the reference picture set (RPS) and/or the distance between the reference pictures and the current coding picture (e.g., in HEVC WD9). In case the reference pictures are not in the default order in the list, the list may be modified (e.g., using the list modification specified in HEVC) to assign a reference picture (e.g., each reference picture) into the list. Table 1 is an example of a reference picture list modification syntax (e.g., the syntax specified in HEVC WD9). The HEVC list modification may simplify the list construction process and may allow flexibility in the use of reference picture lists L0 and L1 for temporal motion compensation.

TABLE 1

Example of a Reference Picture List Modification Syntax

| Ref_pic_list_modification( ) { | Descriptor |
|---|---|
|   if( slice_type = = P \|\| slice_type = = B ) { | |
|     ref_pic_list_modification_flag_l0 | u(1) |
|     if( ref_pic_list_modification_flag_l0 && NumPocTotalCurr > 1 ) | |
|       for( i = 0; i <= num_ref_idx_l0_active_minus1; i++ ) | |
|         list_entry_l0[ i ] | u(v) |
|   } | |
|   if( slice_type = = B ) { | |
|     ref_pic_list_modification_flag_l1 | u(1) |
|     if( ref_pic_list_modification_flag_l1 && NumPocTotalCurr > 1 ) | |
|       for( i = 0; i <= num_ref_idx_l1_active_minus1; i++ ) | |
|         list_entry_l1[ i ] | u(v) |
|   } | |
| } | |

The reference picture list may include one or more temporal (e.g., shown by solid lines) and/or inter-layer (e.g., shown by dashed lines) reference pictures as shown in FIG. 3, for example, for multiple layer video coding. An inter-layer reference picture may be derived from an inter-layer reference picture set and/or inferred from a co-located reference picture's RPS from its dependent layer. The default reference picture list may be constructed by putting temporal reference pictures in front of the inter-layer reference pictures in the reference picture list. This may be done because there may be a high correlation in the temporal domain. The inter-layer reference picture may present higher correlation than a temporal reference picture for certain scenarios. For example, when the temporal distance from the temporal reference pictures is relatively large, inter-layer reference pictures may offer higher correlation than temporal references. A multi-pass encoder may be able to adjust the position of inter-layer reference picture based on the statistics collected from the first pass encoding, for example, to improve the coding efficiency. Appropriate reference picture list modification may be designed to handle reordering of a temporal reference picture and/or an inter-layer reference picture, for example, for a scalable video system.

Figure 4:
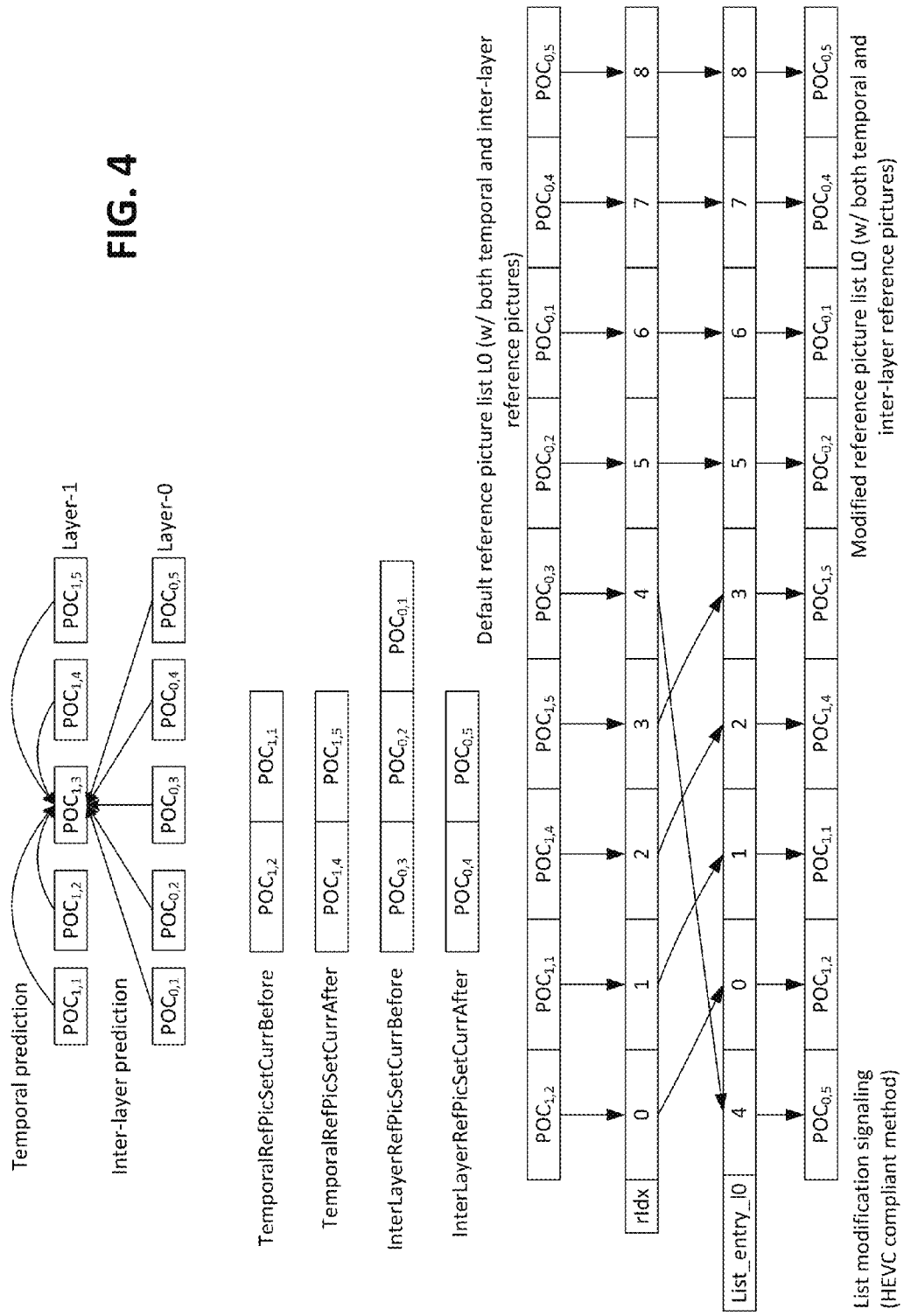
FIG. 4 is a diagram illustrating an example of the reference picture list construction using temporal and inter-layer reference pictures in a decoded picture buffer (DPB).

The position of a reference picture in a reference picture list may be signaled when the reference picture list modification flag is set, for example, as shown in Table 1 and/or FIG. 4. Reference picture list modification signaling may signal a reference picture (e.g., only the reference picture) whose order may be changed from the default list, for example, to save overhead bits. An indicator of the reordered picture may be added into a reference picture list modification syntax. Table 2 illustrates an example of reference picture list modification signaling.

TABLE 2

Example of a Reference Picture List Modification Syntax

| ref_pic_list_modification( ) { | Descriptor |
|---|---|
| if( slice_type != 2) { // P slice or B slice | |
|     ref_pic_list_modification_flag_l0 | u(1) |
|     if( ref_pic_list_modification_flag_l0 && NumPocTotalCurr > 1) | |
|         num_ref_pic_reordered_l0_minus1 | ue(v) |
|         for ( i =0; i < num_ref_pic_reordered; i++ ) { | |
|             init_list0_idx | u(v) |
|             modified_list0_idx | u(v) |
|         } | |
|     } | |
| if( slice_type == 1) { // B slice | |
|     ref_pic_list_modification_flag_l1 | u(1) |
|     if( ref_pic_list_modification_flag_l1 && NumPocTotalCurr > 1 ) | |
|         num_ref_pic_reordered_l1_minus1 | ue(v) |
|         for ( i =0; i < num_ref_pic_reordered; i++ ) { | |
|             init_list1_idx | u(v) |
|             modified_list1_idx | u(v) |
|         } | |
|     } | |
| } | |

An inter-layer reference picture may be placed behind one or more temporal reference pictures. A modification implementation (e.g., a HEVC list modification method) may be used to signal a reference picture in the list, for example, to rearrange the position of the inter-layer reference picture. FIG. 4 is a diagram illustrating an example of the reference picture list construction (e.g., using list 0 or L0 as an example) using temporal reference picture and inter-layer reference pictures in the DPB. For example, for the current coding picture $POC_{1,3}$, there may be four temporal reference pictures (e.g., $POC_{1,1}$, $POC_{1,2}$, $POC_{1,4}$, $POC_{1,5}$), one co-located inter-layer reference picture ($POC_{0,3}$), and four non-colocated inter-layer reference pictures (e.g., $POC_{0,1}$, $POC_{0,2}$, $POC_{0,4}$, $POC_{0,5}$). The default reference picture list 0 (L0) may be constructed by placing the temporal reference pictures prior to the inter-layer reference pictures. In case the co-located reference picture ($POC_{0,3}$) may be the best reference picture, the co-located reference picture may be moved to the first position of L0. The reference position index of each reference picture may be signaled (e.g., list_entry_l0) to construct the reordered L0. For example, as shown in FIG. 4, nine syntax elements may be signaled to the decoder even though the position of one reference picture (e.g., the collocated inter-layer reference $POC_{0,3}$) may be changed.

Reference picture list modification signaling to support mixed temporal and inter-layer reference picture reordering may be described herein. Reordering of a combined list of temporal and inter-layer reference pictures may be described herein. Reference picture list modification may be applied on the slice level. The reference picture list(s) may remain unchanged for the video blocks in the slice.

The syntax element init_listX_idx and modified_listX_idx (e.g., X may be 0 or 1) may indicate a change from the initial reference picture list to the reference picture list to be used for decoding a video block (e.g., a slice). The syntax element num_ref_pic_reordered_1X_minus1 plus 1 may indicate a number of reference pictures to be reordered in the reference picture list. The syntax element init_listX_idx may indicate an index of a reordered picture in the initial listX (e.g., as specified by RefPicSetCurrTempListX in HEVC). The syntax element modified_listX_idx may indicate an index of a reordered picture to be placed in a modified reference picture list LX.

Signaling may indicate (e.g., only indicate) those reference pictures whose order is to be changed in the reference picture list. A reference picture whose ordering is not being changed may be the same as in the initial reference picture list even though its position index may be changed. For example, a reference picture whose ordering is not being directly changed (e.g., only indirectly changed via the reordering of the reference picture indicated by the signaling) may be the same as in the initial reference picture list even though its position index may be changed. Reference picture list modification may be applied on the slice level. The reference picture list(s) may remain unchanged for the video blocks in the slice.

Figure 5:
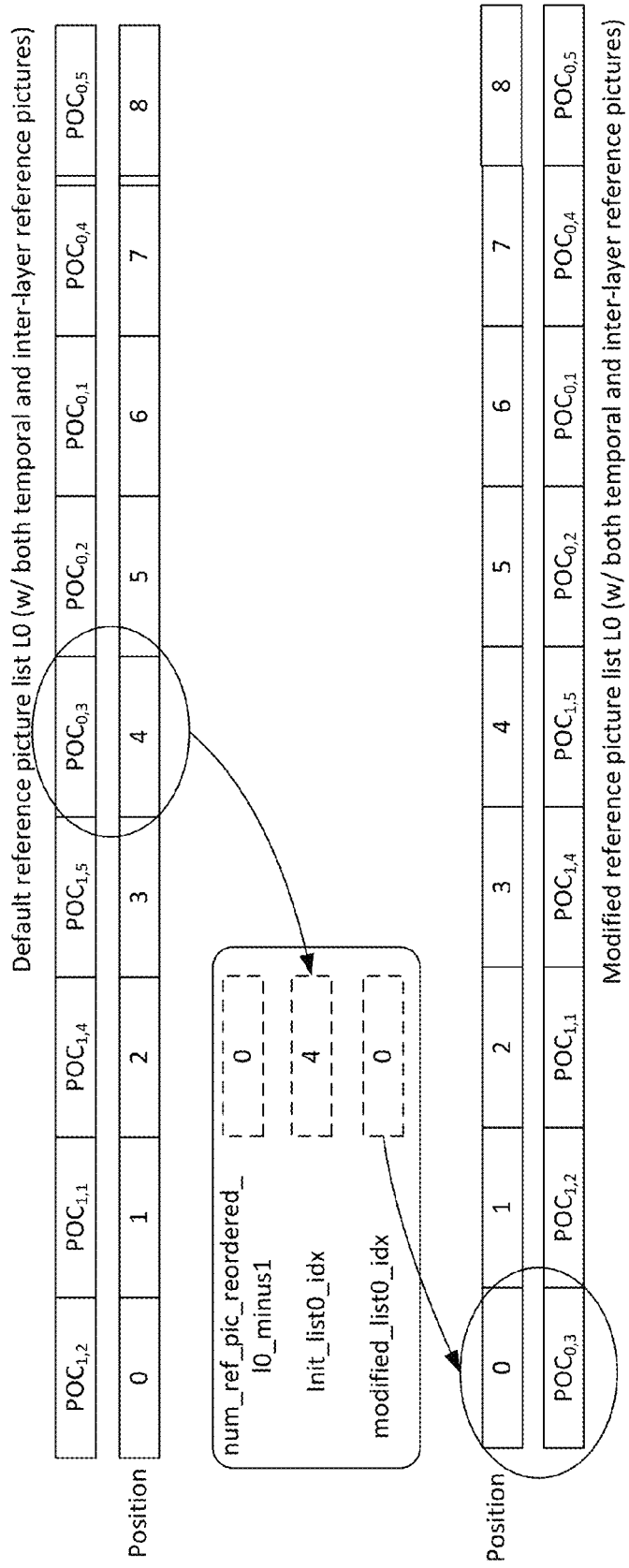
FIG. 5 is a diagram illustrating an example of list modification signaling.

FIG. 5 is a diagram illustrating an example of list modification signaling. For example, three syntax elements may be used in the example of FIG. 5 instead of the nine syntax elements used in the example of FIG. 4. The signaling may be applied for single layer video coding systems and/or multi-layer video coding systems. For example, a reference picture (e.g., $POC_{0,3}$) may be in a first position (e.g., position four) in a reference picture list. An indication (e.g., num_ref_pic_reordered_1X_minus1) may be received to indicate a number of reference pictures to be reordered in the reference picture list. An indication (e.g., init_listX_idx) may be received to indicate that a reference picture (e.g., $POC_{0,3}$) in the reference picture list may be repositioned. An indication (e.g., modified_listX_idx) may be received to indicate a position (e.g., position zero) for the reference picture after it is repositioned. The reference picture (e.g., $POC_{0,3}$) may be repositioned from a first position (e.g., modified_listX_idx). The output of the reference picture list modification may be the reference picture list RefPicModifiedListX.

When decoding a P slice and/or a B slice, there may be one or more reference picture(s) in RefPicTempListX (e.g., NumPocTotalCurr>1). The following procedure may be conducted to construct a modified reference picture list (e.g., RefPicModifiedListX):

```
cIdx = 0
i = 0;
for( rIdx=0; rIdx <= num_ref_idx_lX_active_minus1; rIdx++) {
    if ( (i <= num_ref_pic_reordered_lX_minus1) && (rIdx ==
modified_listX_idx[i])) {
        RefPicModifiedListX[rIdx] = RefPicTempListX[init_listX_idx[i]];
        i ++;
    }
    else {
        is_ref_pic_reordered = true;
        while ((is_ref_pic_reordered == true) && (cIdx < NumPocTotalCurr)) {
        is_ref_pic_reoredered = false;
            for (j = 0; j <= num_ref_pic_reordered_lX_minux1; j ++) {
                if (cIdx == init_listX_idx[j]) {
                    cIdx ++;
                    is_ref_pic_reordered = true;
                    break;
                }
            }
        }
        if (cIdx < NumPocTotalCurr)
            RefPicModifiedListX[rIdx] = RefPicTempListX[cIdx++];
    }
}
``` position four) to a second position (e.g., position zero) based on the indication (e.g., num_ref_pic_reordered_1X_minus1, init_listX_idx, and/or modified_listX_idx). The reference pictures previously associated with the second position (e.g., position zero) and those positions between the first position and the second position (e.g., positions one, two, and three) may be shifted based on the repositioning of the reference picture (e.g., $POC_{0,3}$). For example, the reference pictures previously associated with the second position (e.g., position zero) and those positions between the first position and the second position (e.g., positions one, two, and three) may be shifted without receiving an indication to shift those reference pictures. Although the reference picture (e.g., $POC_{0,3}$) is repositioned to a position before it in the reference picture list, the signaling may be used to reposition the reference picture to a position after it in the reference picture list. Although one reference picture is repositioned based on the signaling, a plurality of reference pictures may be repositioned based on the signaling, for example, as described herein.

Figure 6:
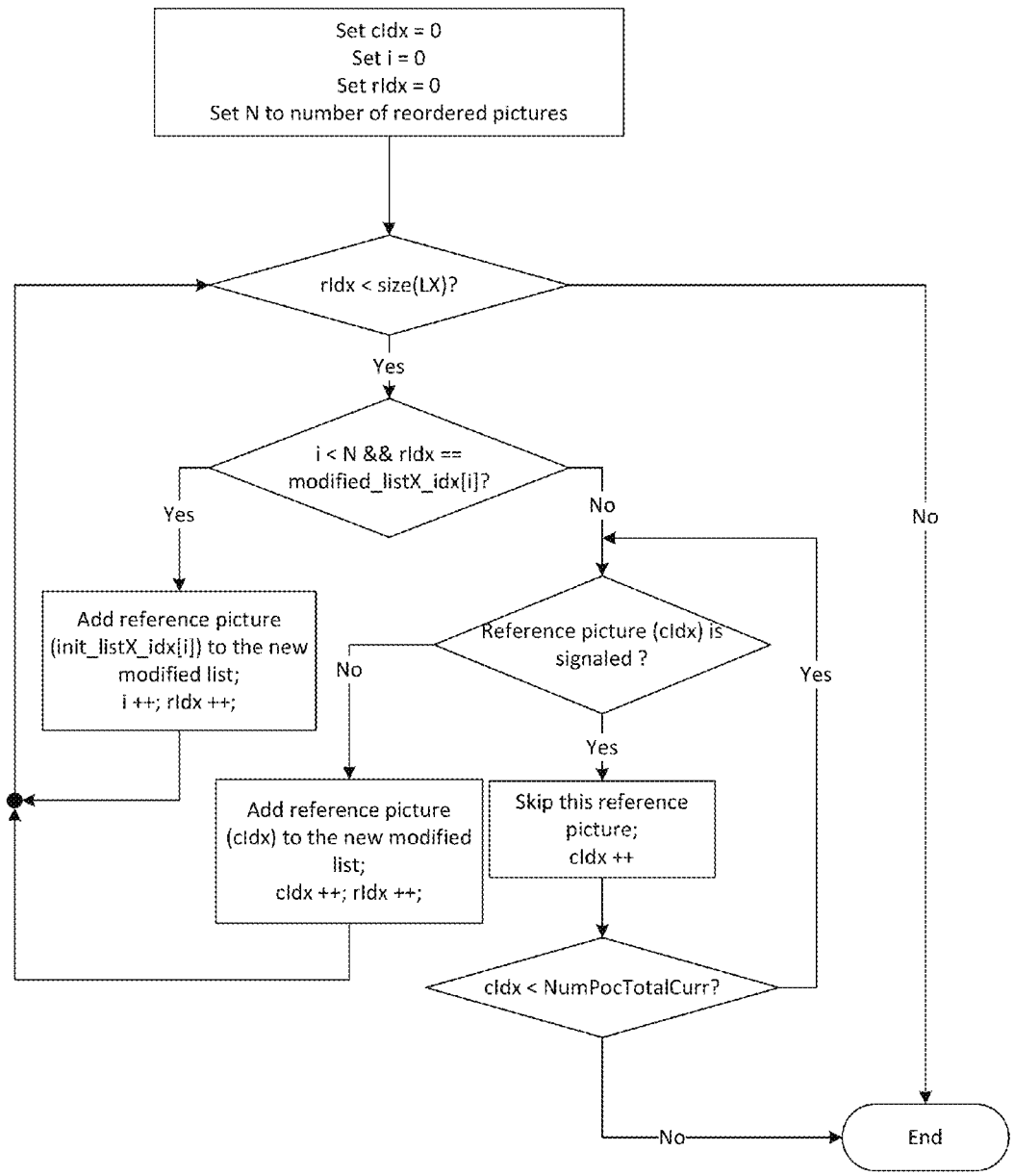
FIG. 6 is a flowchart illustrating an example of a reference picture list modification decoding process.

A reference picture list initialization process for temporal prediction and/or for inter-layer prediction may be provided. For example, the syntax element RefPicListTempX may indicate an initial reference picture list. The syntax element cIdx may indicate the position index of the reference picture(s) in the RefPicListTempX (e.g., X being 0 or 1). The input to reference picture list modification may be one or more of the initial reference picture list (e.g., RefPicListTempX), the initial index of reference picture (e.g., cIdx), the number of reference picture(s) reordered (e.g., num_ref_pic_reordered_1X_minus1), the index of the reference picture in RefPicListTempX (e.g., init_listX_idx), a total number of reference pictures used by current picture in DPB (e.g., NumPocTotalCurr), and the index of a reordered reference picture in the modified reference picture list (e.g., FIG. 6 is a flowchart illustrating an example of reference picture list modification decoding. Reference picture list modification signalling and/or decoding may be applied to multiple layer video coding and/or to single layer video coding with temporal reference pictures.

Figure 9A:
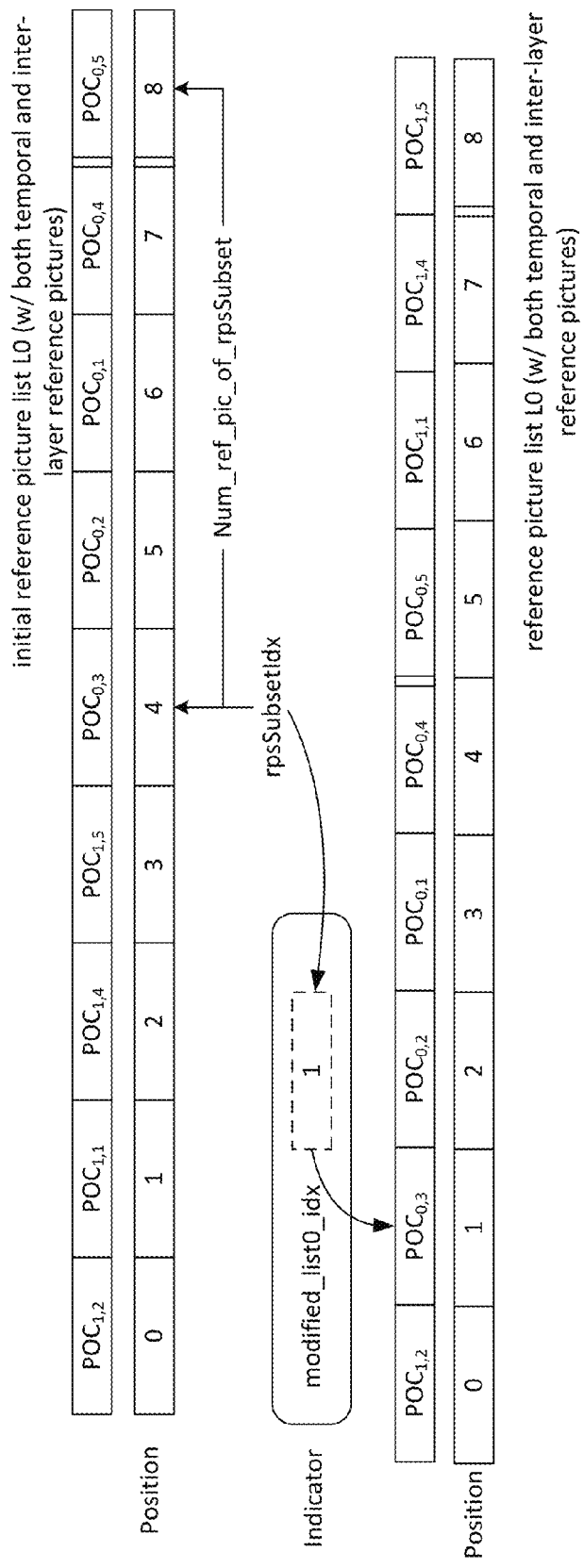
FIG. 9A is a diagram illustrating an example of a reference picture list construction with a single indicator.

An indicator (e.g., modified_listX_idx) may be signaled in a bitstream to specify a position within a reference picture list. A subset of the initial listX (e.g., as specified by RefPicSetCurrTempListX) may be repositioned, for example, repositioned to the position indicated by the indicator. The subset of the initial listX may be inter-view reference pictures and/or inter-layer reference pictures. The indicator may be a variable, for example, a single indicator (e.g., modified_listX_idx). The encoder and/or decoder may be aware (e.g., mutually aware) that the placement of the reference pictures are designated for a subset of reference pictures (e.g., inter-layer reference pictures). The indicator may be a variable. The indicator may be signaled in a parameter set (e.g., Video Parameter Set (VPS), Sequence Parameter Set (SPS), Picture Parameter Set (PPS), or the like). The indicator may be signaled in a slice header (e.g., a flag in the slice header) for reference picture list construction. FIG. 9A illustrates an example reference picture list construction with a single indicator signaling.

The following may be conducted to construct a reference picture list (e.g., RefPicListX) with a single indicator (e.g., modified_listX_idx):

```
cIdx = 0
for( rIdx=0; rIdx <= num_ref_idx_lX_active_minus1; rIdx++) {
    if ( rIdx == modified_listX_idx ) {
        i = rpsSubsetIdx;
        j = num_ref_pic_of_rpsSubset;
        while ((j) && (rIdx <= num_ref_idx_lX_active_minus1))
```

```
        {
            RefPicListX[rIdx++] = RefPicTempListX[i++];
            j --;
        }
    }
    else {
        if (cIdx == rpsSubsetIdx) {
            cIdx += num_ref_pic_of_rpsSubset;
        }
        RefPicListX[rIdx++] = RefPicTempListX[cIdx++];
    }
}
```

For example, rpsSubsetIdx may be the index of the first picture of the reference picture subset of the initial listX, for example, as specified by RefPicSetCurrTempListX. For example, num_ref_pic_of_rpsSubset may be the number of reference pictures that may belong to the designated reference picture subset.

A sub-set of the plurality of reference pictures within the reference picture list may be repositioned according to an indication to reposition a reference picture of the sub-set, for example, as shown in FIG. 9A. An indicator (e.g., num_ref_pic_of_rpsSubset) may be received that indicates the sub-set of reference pictures that are to be repositioned within the reference picture list. An indicator (e.g., rpsSubsetIdx) may be included in the slice header of a reference picture (e.g., $POC_{0,3}$). The reference picture may be included in the sub-set of reference pictures. The indicator may indicate a position (e.g., position one) within in the reference picture list to reposition the reference picture (e.g., $POC_{0,3}$). The reference picture may be repositioned to the position within the reference picture list based on the indication. The remaining reference pictures in the sub-set of reference pictures (e.g., $POC_{0,2}$, $POC_{0,1}$, $POC_{0,4}$, and $POC_{0,5}$) may be repositioned in the reference picture list after the reference picture indicated by the indicator (e.g., to positions two, three, four, and five). One or more reference pictures not associated with the sub-set of the plurality of reference pictures (e.g., $POC_{1,1}$, $POC_{1,4}$, and $POC_{1,5}$) may be shifted within the reference picture list according to the repositioning of the sub-set of reference pictures (e.g., to positions six, seven, and eight), for example, although indicators to reposition the reference pictures were not received. The sub-set of the plurality of reference pictures may be inter-layer reference pictures and/or inter-view reference pictures. The inter-layer reference pictures may be repositioned in front of a temporal reference picture within the reference picture list, for example, without receiving an indication to reposition the temporal reference picture.

Figure 7:
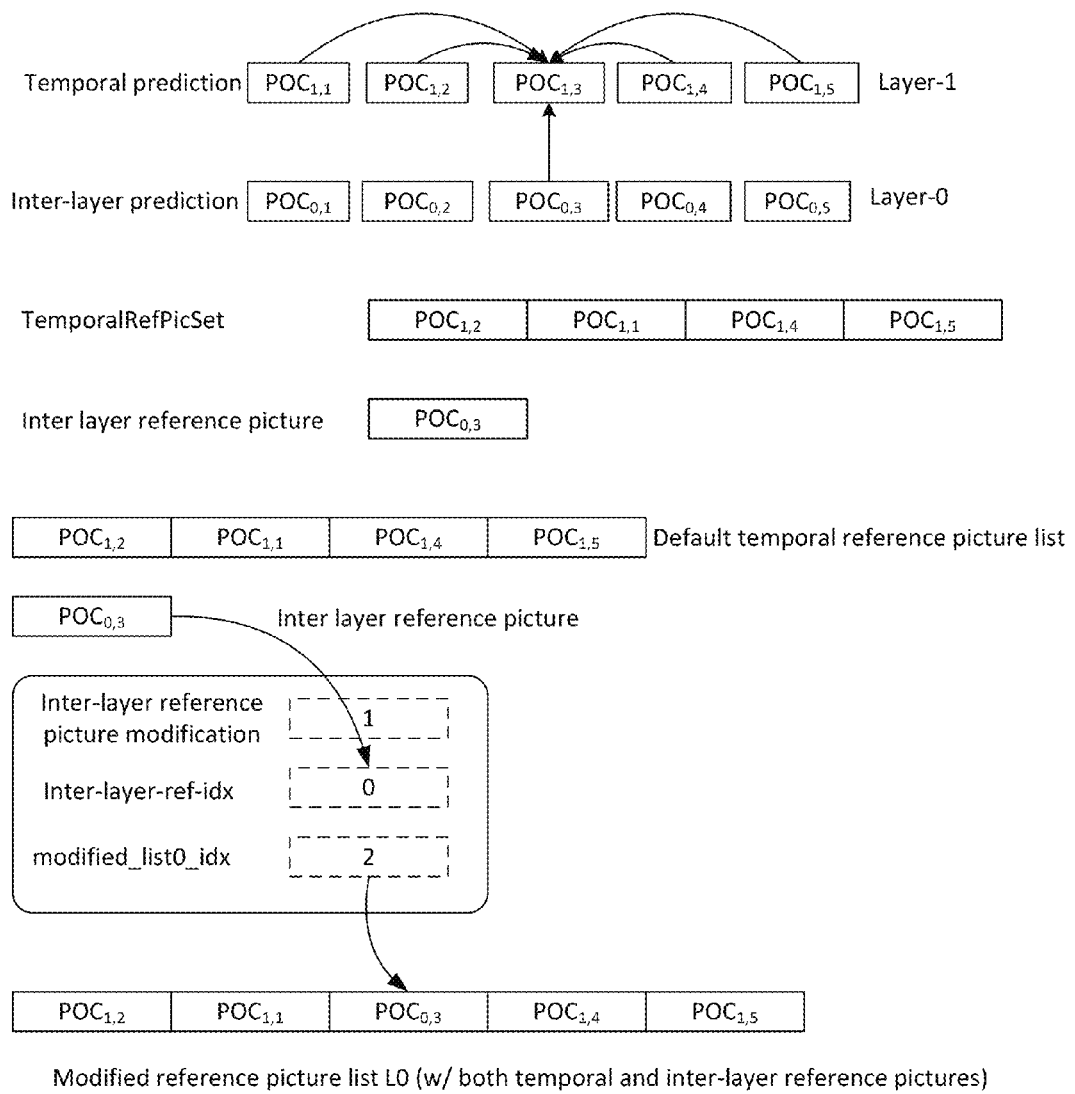
FIG. 7 is a diagram illustrating an example of list modification signaling.

A reference picture list modification implementation may be utilized for a multi-layer video coding system. FIG. 7 is a diagram illustrating an example of reference picture list modification signaling. For example, there may be two reference picture sets, a temporal reference picture set and an inter-layer reference picture set. Reference picture list modification may be applied on the slice level. The reference picture list(s) may remain unchanged for the video blocks in the slice. FIG. 7 may illustrate one collocated reference picture in the inter-layer reference picture set, although more than one collocated reference picture may be utilized. The collocated inter-layer reference picture (e.g., $POC_{0,3}$) may be used the most as it may be captured at the same time instance as the current picture being coded (e.g., $POC_{1,3}$). The collocated inter-layer reference picture may offer higher correlation than temporal reference pictures.

A modification of the temporal reference picture list may be compliant with the list modification process utilized in a single layer video coding standard (e.g., HEVC or AVC). Inter layer reference picture list modification may be deployed on the top of a modified temporal reference picture list to form the final reference picture list for multi-layer video coding. The placement of inter-layer reference pictures in the reference picture lists may be specified.

An indicator (e.g., the inter_layer_ref_pic_modification_flag) may be included in a slice header to indicate whether the modification of the inter-layer reference picture is performed. The indicator may be a variable (e.g., a flag or the like) in the slice header of the current picture. The inter-layer reference picture may be positioned ahead and/or behind a temporal reference picture in the reference picture list.

If the indicator (e.g., inter_layer_ref_pic_modification_flag) is set to 1, then additional syntax element pairs may be signaled to indicate the placement of the inter-layer reference picture in the reference picture list. One or more syntax elements (e.g., indicators) may be signaled for an inter-layer reference picture to be inserted in the reference picture list. A syntax element specifying how many pairs exist may be signaled.

A syntax element in the pair (e.g., inter_layer_ref_pic_idx) may be used to indicate which one of the inter-layer reference pictures from the inter-layer reference picture set may be added into the reference picture list. A syntax element in the pair (e.g., modified_listX_idx) may be used to indicate the index in the reference picture list LX assigned to the inter-layer reference picture represented by inter_layer_ref_pic_idx. As an inter-layer reference picture is inserted into the reference picture list, the following reference pictures may be shifted (e.g., to the right and/or to the back) in the reference picture list (e.g., by 1).

A reference picture (e.g., an inter-layer reference picture) may be inserted into a reference picture list for a slice, for example, according the signaling described in reference to FIG. 7. A bitstream (e.g., a scalable bitstream) may include a reference picture list and/or a reference picture set. The reference picture list may include a plurality of temporal reference pictures, for example, for temporal prediction of the slice. The reference picture set may include a plurality of inter-layer reference pictures for the slice, for example, for inter-prediction of the video block.

An indication (e.g., inter_layer_ref_pic_modification_flag) to insert an inter-layer reference picture (e.g., $POC_{0,3}$) of the reference picture set at a position within the reference picture list may be received. An indication (e.g., inter_layer_ref_pic_idx) may indicate the reference picture (e.g., $POC_{0,3}$) to be inserted into the reference picture list. An indication (e.g., modified_listX_idx) may indicate the position (e.g., position two) where the reference picture (e.g., $POC_{0,3}$) is to be inserted. The inter-layer reference picture (e.g., $POC_{0,3}$) may be inserted into the reference picture list at the position. A temporal reference picture previously associated with the position (e.g., $POC_{1,4}$) may be shifted in the reference picture list, for example, without receiving an indication to reposition the temporal reference picture. For example, one or more temporal reference pictures (e.g., $POC_{1,4}$ and $POC_{1,5}$) may be repositioned according to the indication to insert the inter-layer reference picture (e.g., $POC_{0,3}$). The size of the reference picture list may increase upon the insertion of the inter-layer reference picture, for example, from four reference pictures to five reference pictures).

Table 3 illustrates an example syntax structure.

TABLE 3

Example of a Proposed Reference Picture List Modification Syntax

| inter_layer_ref_pic_list( ) { | Descriptor |
|---|---|
|     if( slice_type != 2 && NumInterLayerRefPic > 1 ) { // P slice or B slice | |
|         inter_layer_ref_pic_modification_flag_l0 | u(1) |
|         if( inter_layer_ref_pic_modification_flag_l0 ) | |
|             num_mod_inter_layer_ref_pic_l0_minus1 | ue(v) |
|             for ( i =0; i <= num_mod_inter_layer_ref_pic_l0_minus1; i++ ) { | |
|                 inter_layer_ref_pic_idx[i] | u(v) |
|                 modified_list0_idx[i] | u(v) |
|             } | |
|     } | |
|     if( slice_type == 1 && NumInterLayerRefPic > 1 ) { // B slice | |
|         inter_layer_ref_pic_modification_flag_l1 | u(1) |
|         if( inter_layer_ref_pic_modification_flag_l1 ) | |
|             num_mod_inter_layer_ref_pic_l1_minus1 | ue(v) |
|             for ( i =0; i < num_mod_inter_layer_ref_pic_l1_minus1; i++ ) { | |
|                 inter_layer_ref_pic_idx[i] | u(v) |
|                 modified_list1_idx[i] | u(v) |
|             } | |
|     } | |
| } | |

The following pseudo-code may specify a reference picture list construction process. The array RefPicTemporalListX may indicate a reference picture list (e.g., intermediate reference picture list) comprising temporal reference pictures (e.g., only temporal reference pictures). The construction process for RefPicTemporalListX may be backward compatible with single layer coding system and may be done according to a single layer video coding implementation (e.g., HEVC or H.264/AVC). The array RefPicInterLayerListX may be a reference picture list (e.g., intermediate reference picture list) comprising inter-layer reference pictures (e.g., only inter-layer reference pictures). The output array RefPicListX may be a reference picture list (e.g., the final reference picture list) that comprises temporal and inter-layer reference pictures.

```
cIdx = 0
for( i = 0; i <= num_ref_pic_lx_active_minus1; i++)
    RefPicListX[i] = RefPicTemporalListX[i];
for( i = 0; i <= num_mod_inter_layer_ref_pic_lx; i++) {
    for(rIdx = num_ref_pic_lx_active_minus1+i ; rIdx >
modified_listX_idx[i]; rIdx--)
        RefPicListX[rIdx] = RefPicListX[rIdx-1];
    RefPicListX[modified_listX_idx[i]] =
RefPicInterLayerListX[inter_layer_ref_pic_idx[i]];
}
```

FIG. 7 is a diagram illustrating an example of a reference picture list modification process. FIG. 7 illustrates an example of one inter-layer reference picture (e.g., the collocated picture), but the signaling method may accommodate more than one inter layer reference picture. There may be no default placement of inter-layer reference pictures within the reference picture list of a slice. An indicator (e.g., inter_layer_ref_pic_modification_flag) may not be sent. The indicator may be inferred to be 1. Syntax elements (e.g., inter_layer_ref_pic_idx and modified_listX_idx) may be sent to indicate where to place an inter-layer reference picture in the reference picture list(s).

An enhancement layer picture/slice coded as a B picture/slice may have more than one reference picture lists. For example, an enhancement layer picture/slice coded as a B picture/slice may have two reference picture lists, list 0 and list 1. One or more inter-layer reference pictures/slices may be inserted into one or more reference picture lists, for example, for one or more of the input pictures/slices. One or more inter-layer reference pictures/slices may be inserted into one list but not both lists, for example, for one or more of the input pictures/slices. One or more inter-layer reference pictures/slices may not be inserted into either list. Similar implementations may be utilized for P picture/slices, which, for example, may have one reference picture list (e.g., list 0). For example, for one or more P coded pictures/slices, the inter-layer reference pictures/slices may be inserted into a list (e.g., list 0). For one or more P coded pictures/slices, one or more temporal reference pictures but not inter-layer reference pictures may be inserted into the list (e.g., list 0). Inter-layer reference pictures may be inserted into both list 0 and list 1 of B picture/slices at a first temporal layer, and inserted into list 0 of B picture/slices at higher temporal layers of a hierarchical coding structure, for example, random access (RA). Inter-layer reference pictures may be inserted to list 0 of P picture/slices.

An indicator may be utilized to indicate whether or not one or more inter-layer reference pictures may be inserted into one or more reference picture lists. For example, a variable (e.g., a one-bit flag) per reference picture list may be used to indicate whether or not one or more inter-layer reference pictures may be inserted into a list. The variable may be applied to a sequence-level signaling set, a picture-level signaling set, and/or a slice-level signaling set, such as but not limited to Video Parameter Set (VPS), Sequence Parameter Set (SPS), Picture Parameter Set (PPS), slice segment header, etc. Table 4 illustrates an example where syntax may be added to a slice segment header to signal whether to insert an inter-layer reference picture in a reference picture list.

Signaling indicating whether one or more inter-layer reference pictures may be inserted into one or more lists may be independent from or combined with reference picture repositioning, for example, as described with reference to FIG. 7. For example, it may be determined whether an inter-layer reference picture may be included in a reference picture list, and repositioning may be performed on the inter-layer reference picture. A reference picture may be inserted into a reference picture list and/or a reference picture may be repositioned within the reference picture list.

TABLE 4

Example of a Modified Slice Segment Header Syntax

| slice_segment_header( ) { | Descriptor |
|---|---|
| ... | |
|   if( tiles_enabled_flag \|\| | |
|   entropy_coding_sync_enabled_flag ) { | |
|     num_entry_point_offsets | ue(v) |
|     if( num_entry_point_offsets > 0 ) { | |
|       offset_len_minus1 | ue(v) |
|       for( i = 0; i < num_entry_point_offsets; i++ ) | |
|         entry_point_offset[ i ] | u(v) |
|     } | |
|   } | |
|   if(layer_id > 0) { | |
|     if(slice_type = = P \|\| slice_type = = B ) | |
|       inter_layer_ref_list0_enabled_flag | u(1) |
|     if(slice_type = = B ) | |
|       inter_layer_ref_list1_enabled_flag | u(1) |
|   } | |
|   if( slice_header_extension_present_flag ) { | |
|     slice_header_extension_length | ue(v) |
|     for( i = 0; i < slice_header_extension_length; i++) | |
|       slice_header_extension_data_byte[ i ] | u(8) |
|   } | |
|   byte_alignment( ) | |
| } | |

Referring to Table 4, an indicator (e.g., inter_layer_ref_list0_enabled_flag) may indicate whether to insert a plurality of inter-layer reference pictures into a reference picture (e.g., list0). An indicator (e.g., inter_layer_ref_list1_enabled_flag) may indicate whether to insert an inter-layer reference picture in reference picture list1. An indicator (e.g., modified_listX_idx) may be signaled in a bitstream to specify the position of a reference picture list where a reference picture (e.g., an inter-layer reference picture) may be positioned (e.g., inserted, repositioned, or the like). The indicator may be a single indicator (e.g., modified_listX_idx). The indicator may be signaled in a parameter set (e.g., video parameter set (VPS), sequence parameter set (SPS), picture parameter set (PPS), etc.) or a slice header for reference picture list construction.

Figure 9B:
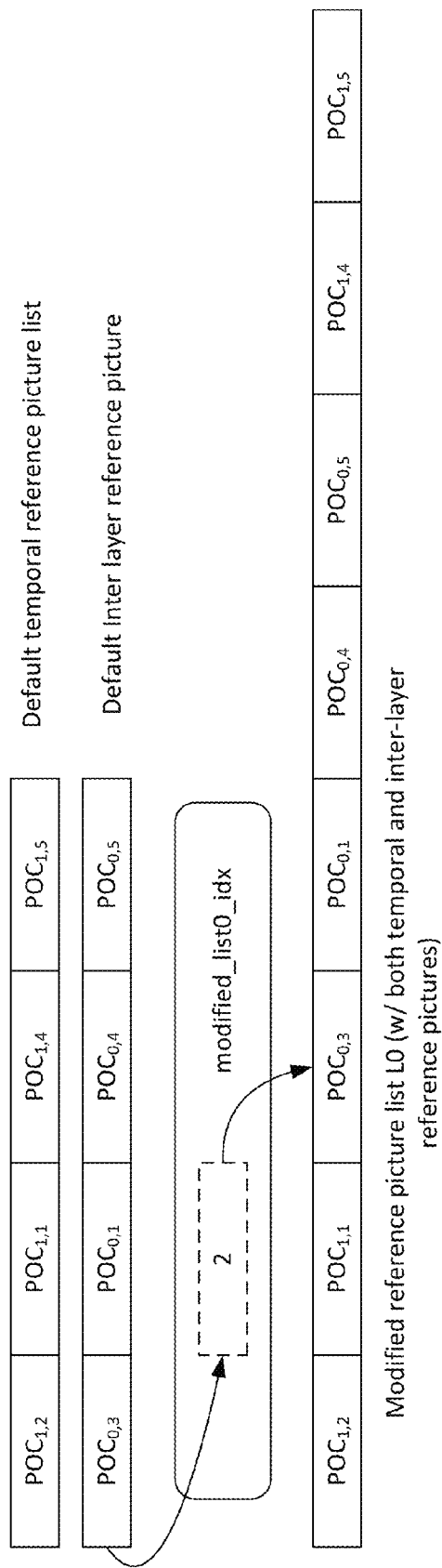
FIG. 9B is a diagram illustrating an example of a reference picture list construction with a single indicator.

FIG. 9B illustrates an example reference list construction with single indicator signaling. A bitstream may include a temporal reference picture list and/or an inter-layer reference picture set. The bitstream may include an indicator (e.g., modified_listX_idx) that may indicate a position (e.g., position two) within the reference picture list. The indicator may be included in a slice header. A plurality of inter-layer reference pictures (e.g., $POC_{0,3}$, $POC_{0,1}$, $POC_{0,4}$, and $POC_{0,5}$) may be inserted into the reference picture list at the indicated position based on the indicator. The inter-layer reference picture that included the indicator (e.g., $POC_{0,3}$) may be inserted at the position (e.g., position two), while the rest of the plurality of inter-layer reference pictures may be inserted at positions following the indicated position in the reference picture list (e.g., positions three, four, and five). The rest of the plurality of inter-layer reference pictures (e.g., $POC_{0,1}$, $POC_{0,4}$, and $POC_{0,5}$) may be inserted into the reference picture list even though an indicator(s) indicating that the rest of the plurality of inter-layer reference pictures may not be received.

The reference pictures (e.g., temporal reference pictures $POC_{1,4}$ and $POC_{1,5}$) that were previously positioned in the reference picture list at those positions may be shifted, for example, according to the indication. For example, the temporal reference pictures $POC_{1,4}$ and $POC_{1,5}$ may be repositioned to positions six and seven in the reference picture list. The reference pictures (e.g., temporal reference pictures $POC_{1,4}$ and $POC_{1,5}$) that were previously positioned in the reference picture list at those positions may be shifted without receiving an indication to shift the reference pictures. The shift may be performed based on the indication to insert the inter-layer reference picture into the reference picture list. By inserting one or more inter-layer reference pictures, the reference picture list may increase in size (e.g., from four to eight).

The following may be conducted to construct a reference picture list (e.g., RefPicListX) with a single indicator (e.g., modified_listX_idx):

```
cIdx = 0
for( rIdx=0; rIdx <= num_ref_idx_lX_active_minus1; rIdx++) {
    if ( rIdx == modified_listX_idx ) {
        i = 0;
        j = sizeof(RefPicInterLayerListX);    // number of inter-layer
        reference pictures
        while ((j) && (rIdx <= num_ref_idx_lX_active_minus1))
        {
            RefPicListX[rIdx++] = RefPicInterLayerListX [i++];
            j --;
        }
    }
    else {
        RefPicListX[rIdx++] = RefPicTempListX[cIdx++];
    }
}
```

Inter-layer reference pictures may be assumed to be placed at the end of the temporal list (e.g., RefPicTemporalListX) to form a reference picture list (e.g., RefPicListX), for example, as provided in a multiview and/or a scalable video coding standard (e.g., H.264/AVC or HEVC). If the inter-layer reference pictures are not placed at the end of the reference picture list, then additional processing may be performed when decoding the bitstream.

Intelligent reference picture reordering techniques based on multi-pass encoding may be utilized to improve video coding efficiency. Multi-pass encoding may be a video encoding technique where a video signal may be encoded by more than one pass. For example, in a first encoding pass, the video signal may be analyzed and encoding statistics may be preserved. The statistics may be used in subsequent passes to dynamically adjust encoding parameters for improved quality. Multi-pass encoding may be performed on slice level, picture level, GOP level, and/or sequence level. Although the reference picture list reordering techniques described herein utilize two encoding passes as an example, additional passes (e.g., more than two encoding passes) may be applied.

Figure 8:
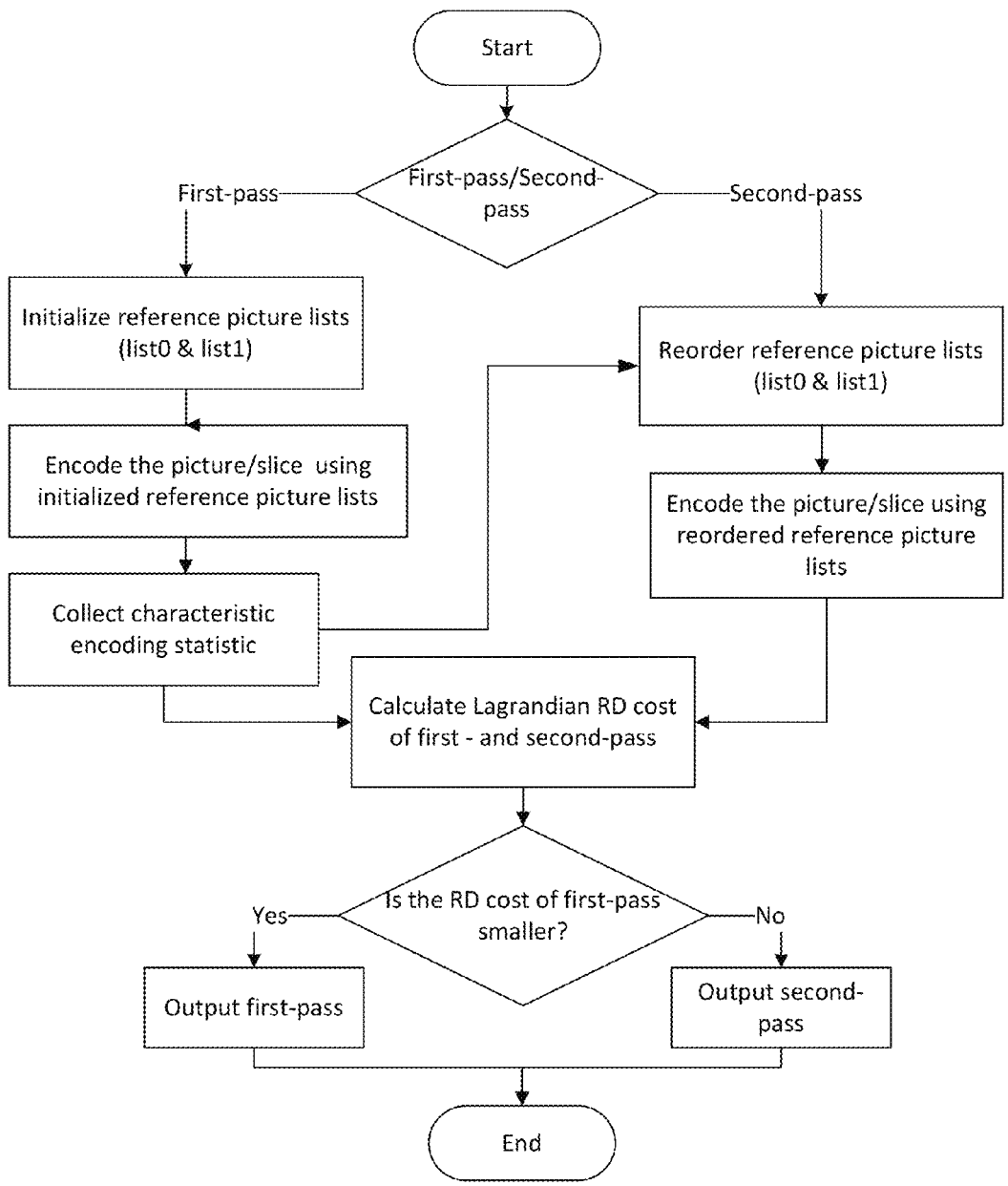
FIG. 8 is a flowchart illustrating an example of an encoder using a reference picture reordering process.

A first-pass may encode a picture or slice using an initial reference picture list for mixed temporal and inter-layer prediction. The first-pass may collect relevant encoding statistics. In a second pass, the collected statistics may be used to reorder the temporal and inter-layer reference pictures. The second pass may use the reordered reference picture lists to perform encoding. To reduce computational complexity, the encoder may retain and compare the generated bit-streams and reconstructed video signals of the first-pass and the second-pass. The encoder may output the bit-stream of the pass that minimizes a pre-defined quality criterion, for example, the Lagrangian rate-distortion (RD) cost. FIG. 8 is a flowchart that illustrates an example of an encoder using a reference picture reordering process. Although FIG. 8 provides an example using two encoding passes, reference picture reordering methods may be applied to more than two passes by iterating the same reordering process for each additional pass.

To modify the initialized reference lists in the second-pass, various types of video statistics may be used to determine the position index of an reference picture in the reordered reference picture lists. For example, reference picture list reordering may be performed based on reference usage. An encoder may count the usage of a reference picture (e.g., each reference picture) in the reference picture list during a first pass. For example, the usage may be collected based on the number of smallest prediction units (SPU) in the currently encoded picture and/or slice that refer to a given reference picture. In a second pass, the encoder may reorder the reference pictures in reference picture lists based on the frequency of their usage.

If multiple reference pictures are present in the one or more reference picture lists, for an encoded block (e.g., a block whose one or more reference picture indices are sent), sending reference indices of large values may incur more overhead bits. The more frequently used reference pictures may be placed in the lower indices of one or more reference picture lists, which may improve coding efficiency. This may reduce the overhead associated with sending reference indices at block level. During a first encoding pass, the encoder may encode a picture or a slice while collecting statistics of reference picture usage. The usage may be collected based on different metrics. For example, metrics may include, but are not limited to, the number of times a reference picture (e.g., each reference picture) is used and the number of video blocks (e.g., SPUs) that refer to one reference in the reference picture lists. The encoder may reorder the reference pictures in the reference picture lists according to their frequency of usage. For example, the encoder may reorder the reference pictures such that the reference pictures that are used more frequently are assigned lower indices. The encoder may perform one or more additional coding passes with the reordered reference picture lists.

Reference picture list reordering may be based on motion-compensated distortion. An encoder may calculate the motion-compensated distortion between the original video blocks (e.g., SPUs) and their prediction blocks based on motion-compensated prediction using the reference pictures in the reference picture list. The reference pictures may be reordered according to their motion-compensated distortions for the second-pass coding.

A reference picture may be selected in the process of motion estimation by a Lagrangian RD criterion that selects the reference picture which minimizes the cost $J_{pred}$, for example, as shown by:

$$J_{pred}=D+\lambda_{pred} \times B_{pred} \quad \text{Equation (1)}$$

where D may be the motion-compensated distortion between one original video block and its prediction block; $B_{pred}$ may be the number of coded bits specifying motion vectors and reference picture index; and $\lambda_{pred}$ may be a Lagrangain weighting factor for motion estimation. Different metrics may be applied to derive motion-compensated distortion, D, such as, but not limited to, sum of square error (SSE), sum of absolute difference (SAD), and sum of absolute transformed differences (SATD). The reference pictures located at the beginning of the initialized reference picture list may have a higher priority than other reference pictures to be selected for inter-prediction (e.g., as illustrated by Equation (1)), which may be due to smaller reference position indices. Reference pictures, which may be more correlated with the current picture but associated with high reference picture indices, may fail to be chosen by the encoder due to the heavy RD weighting part in Equation (1) imposed by the bits used to encode their large indices of the initialized reference picture list.

Indices may be assigned to reference pictures based on their motion-compensated distortion to a current picture and/or slice. For example, as shown in Equation (1), the encoder may collect in a first-pass the motion-compensated distortion of a coding block (e.g., SPU) when it is predicted from different references in the initialized reference picture list. The encoder may sum up the corresponding total distortion for a reference picture in reference picture list. In the second-pass, the encoder may modify the indices in a reference picture list based on the corresponding total distortion. Accordingly, if a reference picture presents a smaller motion-compensated distortion to the current picture after motion compensation, it may be given a smaller index in the reordered reference picture list because it is more useful for inter-prediction. Implementations based on motion-compensated distortion may avoid the interference of the initialized reference picture indices, for example, as described herein. Since one or more motion-compensated distortions may be available during the motion estimation and compensation processes of the first-pass, implementations based on motion-compensated distortion may incur less computation complexity.

Various video distortion metrics may be applied to distortion-based reference picture reordering implementations, which may result in different coding performances. For example, SAD and SATD may be used for motion estimation. Although SATD may be more computationally complicated than SAD by taking an additional frequency transform (e.g., a Hadamard transform) on the difference between the original video block and its prediction block, SATD may more accurately predict video distortion from the viewpoint of both objective and subjective metrics. SATD may be used as the distortion metric for reference picture list reordering in the implementations described herein to pursue the largest coding gain.

Although the reference picture reordering implementations described herein may reorder reference pictures in list0 and list1, they may be equally applied to modify any other reference picture lists, for example, such as but not limited to the combined reference picture list in HEVC.

Signaling of a reference picture list (e.g., reordering and/or insertion of a reference picture) may be performed after a reference picture reordering technique based on multi-pass encoding, for example, as described herein. Constraints may be added to a reference picture reordering technique based on multi-pass encoding, for example, to ensure that a sub-set of reference pictures are kept continuous in the reference picture list. For example, inter-layer reference pictures may be kept continuous (e.g., in continuous positions) within a reference picture list after a reference picture reordering technique based on multi-pass encoding is performed.

Figure 10A:
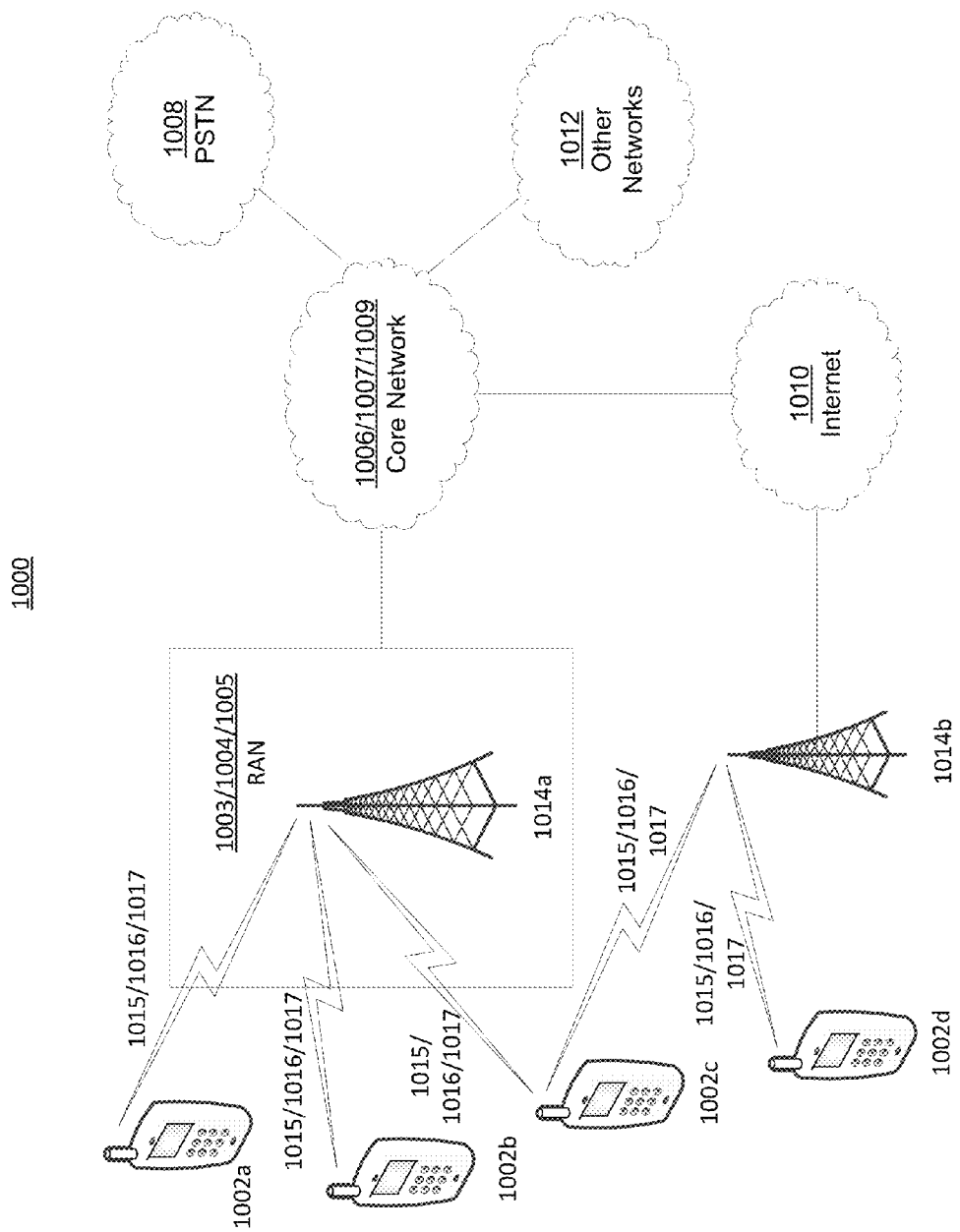
FIG. 10A is a system diagram of an example communications system in which one or more disclosed embodiments may be implemented.

FIG. 10A is a diagram of an example communications system 1000 in which one or more disclosed embodiments may be implemented. The communications system 1000 may be a multiple access system that provides content, such as voice, data, video, messaging, broadcast, etc., to multiple wireless users. The communications system 1000 may enable multiple wireless users to access such content through the sharing of system resources, including wireless bandwidth. For example, the communications systems 1000 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 10A, the communications system 1000 may include wireless transmit/receive units (WTRUs) 1002a, 1002b, 1002c, 1002d, a radio access network (RAN) 1003/1004/1005, a core network 1006/1007/1009, a public switched telephone network (PSTN) 1008, the Internet 1010, and other networks 1012, though it will be appreciated that the disclosed embodiments contemplate any number of WTRUs, base stations, networks, and/or network elements. Each of the WTRUs 1002a, 1002b, 1002c, 1002d may be any type of device configured to operate and/or communicate in a wireless environment. By way of example, the WTRUs 1002a, 1002b, 1002c, 1002d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 1000 may also include a base station 1014a and a base station 1014b. Each of the base stations 1014a, 1014b may be any type of device configured to wirelessly interface with at least one of the WTRUs 1002a, 1002b, 1002c, 1002d to facilitate access to one or more communication networks, such as the core network 1006/1007/1009, the Internet 1010, and/or the networks 1012. By way of example, the base stations 1014a, 1014b may be a base transceiver station (BTS), a Node-B, an eNode B, a Home Node B, a Home eNode B, a site controller, an access point (AP), a wireless router, and the like. While the base stations 1014a, 1014b are each depicted as a single element, it will be appreciated that the base stations 1014a, 1014b may include any number of interconnected base stations and/or network elements.

The base station 1014a may be part of the RAN 1003/1004/1005, which may also include other base stations and/or network elements (not shown), such as a base station controller (BSC), a radio network controller (RNC), relay nodes, etc. The base station 1014a and/or the base station 1014b may be configured to transmit and/or receive wireless signals within a particular geographic region, which may be referred to as a cell (not shown). The cell may further be divided into cell sectors. For example, the cell associated with the base station 1014a may be divided into three sectors. Thus, in one embodiment, the base station 1014a may include three transceivers, i.e., one for each sector of the cell. In another embodiment, the base station 1014a may employ multiple-input multiple output (MIMO) technology and, therefore, may utilize multiple transceivers for each sector of the cell.

The base stations 1014a, 1014b may communicate with one or more of the WTRUs 1002a, 1002b, 1002c, 1002d over an air interface 1015/1016/1017, which may be any suitable wireless communication link (e.g., radio frequency (RF), microwave, infrared (IR), ultraviolet (UV), visible light, etc.). The air interface 1015/1016/1017 may be established using any suitable radio access technology (RAT).

More specifically, as noted above, the communications system 1000 may be a multiple access system and may employ one or more channel access schemes, such as CDMA, TDMA, FDMA, OFDMA, SC-FDMA, and the like. For example, the base station 1014a in the RAN 1003/1004/1005 and the WTRUs 1002a, 1002b, 1002c may implement a radio technology such as Universal Mobile Telecommunications System (UMTS) Terrestrial Radio Access (UTRA), which may establish the air interface 1015/1016/1017 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 1014a and the WTRUs 1002a, 1002b, 1002c may implement a radio technology such as Evolved UMTS Terrestrial Radio Access (E-UTRA), which may establish the air interface 1015/1016/1017 using Long Term Evolution (LTE) and/or LTE-Advanced (LTE-A).

In other embodiments, the base station 1014a and the WTRUs 1002a, 1002b, 1002c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1014b in FIG. 10A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 1014b and the WTRUs 1002c, 1002d may implement a radio technology such as IEEE 802.11 to establish a wireless local area network (WLAN). In another embodiment, the base station 1014b and the WTRUs 1002c, 1002d may implement a radio technology such as IEEE 802.15 to establish a wireless personal area network (WPAN). In yet another embodiment, the base station 1014b and the WTRUs 1002c, 1002d may utilize a cellular-based RAT (e.g., WCDMA, CDMA2000, GSM, LTE, LTE-A, etc.) to establish a picocell or femtocell. As shown in FIG. 10A, the base station 1014b may have a direct connection to the Internet 1010. Thus, the base station 1014b may not be required to access the Internet 1010 via the core network 1006/1007/1009.

The RAN 1003/1004/1005 may be in communication with the core network 1006/1007/1009, which may be any type of network configured to provide voice, data, applications, and/or voice over internet protocol (VoIP) services to one or more of the WTRUs 1002a, 1002b, 1002c, 1002d. For example, the core network 1006/1007/1009 may provide call control, billing services, mobile location-based services, pre-paid calling, Internet connectivity, video distribution, etc., and/or perform high-level security functions, such as user authentication. Although not shown in FIG. 10A, it will be appreciated that the RAN 1003/1004/1005 and/or the core network 1006/1007/1009 may be in direct or indirect communication with other RANs that employ the same RAT as the RAN 1003/1004/1005 or a different RAT. For example, in addition to being connected to the RAN 1003/1004/1005, which may be utilizing an E-UTRA radio technology, the core network 1006/1007/1009 may also be in communication with another RAN (not shown) employing a GSM radio technology.

The core network 1006/1007/1009 may also serve as a gateway for the WTRUs 1002a, 1002b, 1002c, 1002d to access the PSTN 1008, the Internet 1010, and/or other networks 1012. The PSTN 1008 may include circuit-switched telephone networks that provide plain old telephone service (POTS). The Internet 1010 may include a global system of interconnected computer networks and devices that use common communication protocols, such as the transmission control protocol (TCP), user datagram protocol (UDP) and the internet protocol (IP) in the TCP/IP internet protocol suite. The networks 1012 may include wired or wireless communications networks owned and/or operated by other service providers. For example, the networks 1012 may include another core network connected to one or more RANs, which may employ the same RAT as the RAN 1003/1004/1005 or a different RAT.

Some or all of the WTRUs 1002a, 1002b, 1002c, 1002d in the communications system 1000 may include multi-mode capabilities, i.e., the WTRUs 1002a, 1002b, 1002c, 1002d may include multiple transceivers for communicating with different wireless networks over different wireless links. For example, the WTRU 1002c shown in FIG. 10A may be configured to communicate with the base station 1014a, which may employ a cellular-based radio technology, and with the base station 1014b, which may employ an IEEE 802 radio technology.

Figure 10B:
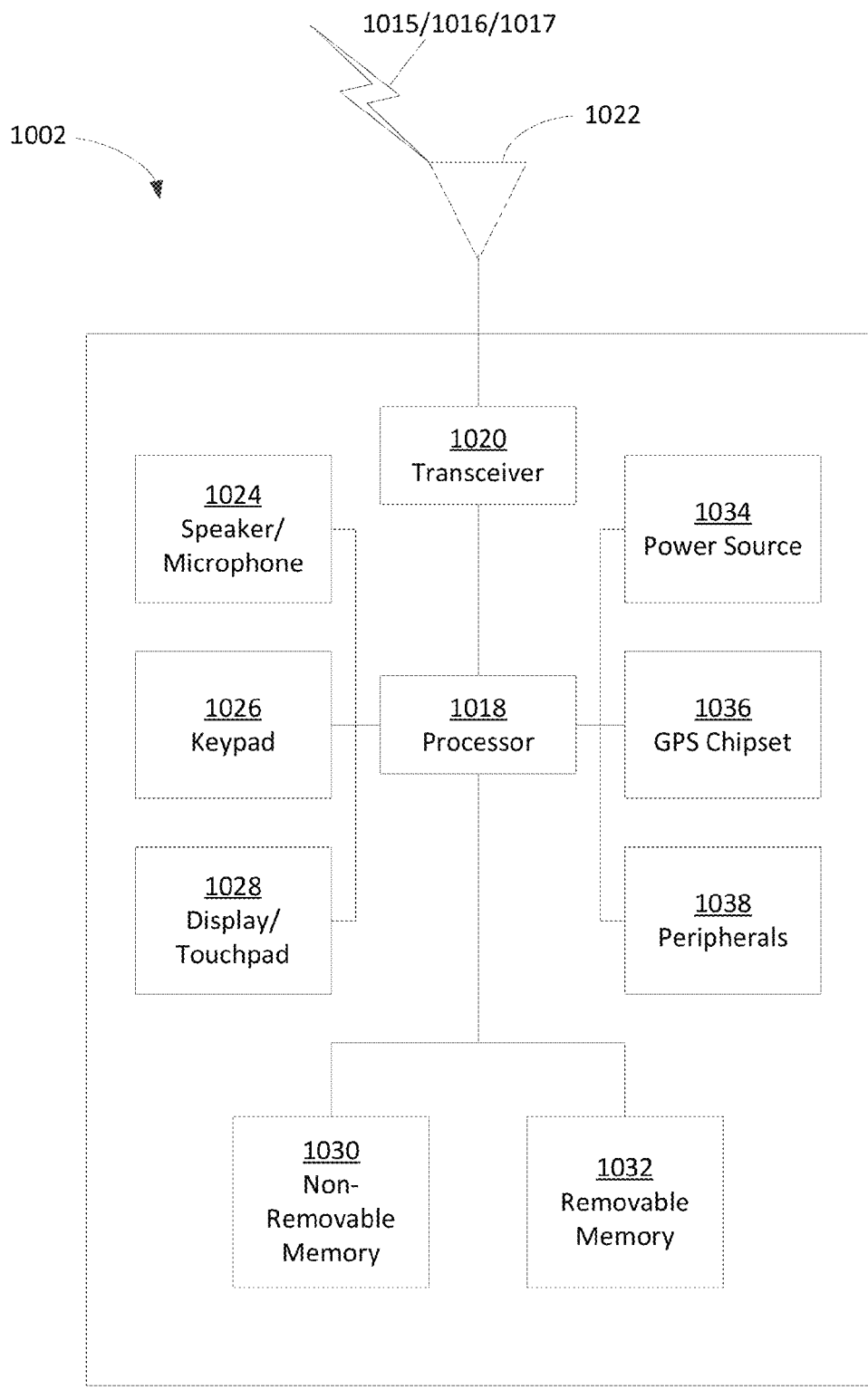
FIG. 10B is a system diagram of an example wireless transmit/receive unit (WTRU) that may be used within the communications system illustrated in FIG. 10A.

FIG. 10B is a system diagram of an example WTRU 1002. As shown in FIG. 10B, the WTRU 1002 may include a processor 1018, a transceiver 1020, a transmit/receive element 1022, a speaker/microphone 1024, a keypad 1026, a display/touchpad 1028, non-removable memory 1030, removable memory 1032, a power source 1034, a global positioning system (GPS) chipset 1036, and other peripherals 1038. It will be appreciated that the WTRU 1002 may include any sub-combination of the foregoing elements while remaining consistent with an embodiment. It is noted that the components, functions, and features described with respect to the WTRU 1002 may also be similarly implemented in a base station.

The processor 1018 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1018 may perform signal coding, data processing, power control, input/output processing, and/or any other functionality that enables the WTRU 1002 to operate in a wireless environment. The processor 1018 may be coupled to the transceiver 1020, which may be coupled to the transmit/receive element 1022. While FIG. 10B depicts the processor 1018 and the transceiver 1020 as separate components, it will be appreciated that the processor 1018 and the transceiver 1020 may be integrated together in an electronic package or chip.

The transmit/receive element 1022 may be configured to transmit signals to, or receive signals from, a base station (e.g., the base station 1014a) over the air interface 1015/1016/1017. For example, in one embodiment, the transmit/receive element 1022 may be an antenna configured to transmit and/or receive RF signals. In another embodiment, the transmit/receive element 1022 may be an emitter/detector configured to transmit and/or receive IR, UV, or visible light signals, for example. In yet another embodiment, the transmit/receive element 1022 may be configured to transmit and receive both RF and light signals. It will be appreciated that the transmit/receive element 1022 may be configured to transmit and/or receive any combination of wireless signals.

In addition, although the transmit/receive element 1022 is depicted in FIG. 10B as a single element, the WTRU 1002 may include any number of transmit/receive elements 1022. More specifically, the WTRU 1002 may employ MIMO technology. Thus, in one embodiment, the WTRU 1002 may include two or more transmit/receive elements 1022 (e.g., multiple antennas) for transmitting and receiving wireless signals over the air interface 1015/1016/1017.

The transceiver 1020 may be configured to modulate the signals that are to be transmitted by the transmit/receive element 1022 and to demodulate the signals that are received by the transmit/receive element 1022. As noted above, the WTRU 1002 may have multi-mode capabilities. Thus, the transceiver 1020 may include multiple transceivers for enabling the WTRU 1002 to communicate via multiple RATs, such as UTRA and IEEE 802.11, for example.

The processor 1018 of the WTRU 1002 may be coupled to, and may receive user input data from, the speaker/microphone 1024, the keypad 1026, and/or the display/touchpad 1028 (e.g., a liquid crystal display (LCD) display unit or organic light-emitting diode (OLED) display unit). The processor 1018 may also output user data to the speaker/microphone 1024, the keypad 1026, and/or the display/touchpad 1028. In addition, the processor 1018 may access information from, and store data in, any type of suitable memory, such as the non-removable memory 1030 and/or the removable memory 1032. The non-removable memory 1030 may include random-access memory (RAM), read-only memory (ROM), a hard disk, or any other type of memory storage device. The removable memory 1032 may include a subscriber identity module (SIM) card, a memory stick, a secure digital (SD) memory card, and the like. In other embodiments, the processor 1018 may access information from, and store data in, memory that is not physically located on the WTRU 1002, such as on a server or a home computer (not shown).

The processor 1018 may receive power from the power source 1034, and may be configured to distribute and/or control the power to the other components in the WTRU 1002. The power source 1034 may be any suitable device for powering the WTRU 1002. For example, the power source 1034 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1018 may also be coupled to the GPS chipset 1036, which may be configured to provide location information (e.g., longitude and latitude) regarding the current location of the WTRU 1002. In addition to, or in lieu of, the information from the GPS chipset 1036, the WTRU 1002 may receive location information over the air interface 1015/1016/1017 from a base station (e.g., base stations 1014a, 1014b) and/or determine its location based on the timing of the signals being received from two or more nearby base stations. It will be appreciated that the WTRU 1002 may acquire location information by way of any suitable location-determination method while remaining consistent with an embodiment.

The processor 1018 may further be coupled to other peripherals 1038, which may include one or more software and/or hardware modules that provide additional features, functionality and/or wired or wireless connectivity. For example, the peripherals 1038 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM)

radio unit, a digital music player, a media player, a video game player module, an Internet browser, and the like.

Figure 10C:
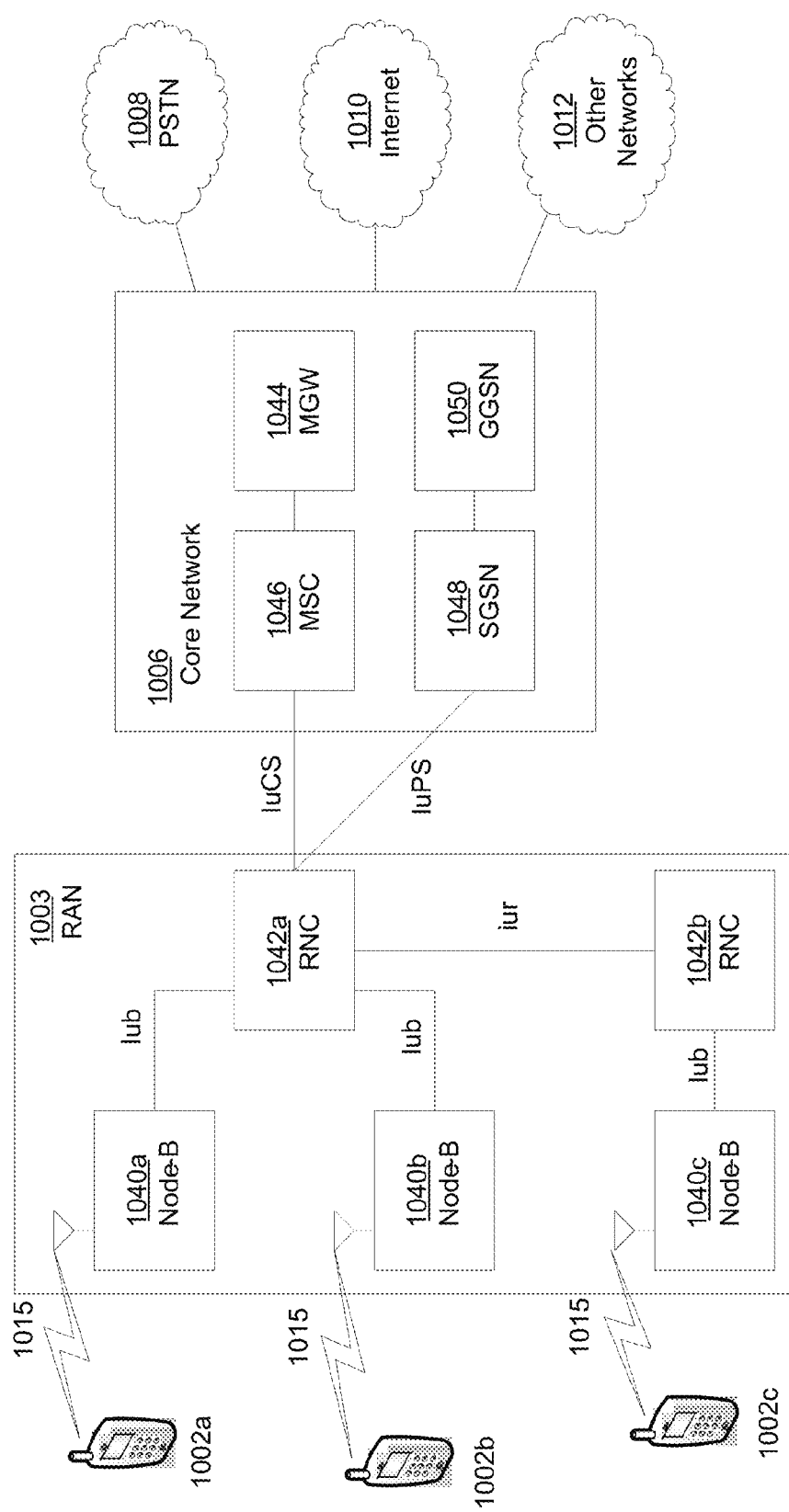
FIG. 10C is a system diagram of an example radio access network and an example core network that may be used within the communications system illustrated in FIG. 10A.

FIG. 10C is a system diagram of the RAN 1003 and the core network 1006 according to an embodiment. As noted above, the RAN 1003 may employ a UTRA radio technology to communicate with the WTRUs 1002a, 1002b, 1002c over the air interface 1015. The RAN 1003 may also be in communication with the core network 1006. As shown in FIG. 10C, the RAN 1003 may include Node-Bs 1040a, 1040b, 1040c, which may each include one or more transceivers for communicating with the WTRUs 1002a, 1002b, 1002c over the air interface 1015. The Node-Bs 1040a, 1040b, 1040c may each be associated with a particular cell (not shown) within the RAN 1003. The RAN 1003 may also include RNCs 1042a, 1042b. It will be appreciated that the RAN 1003 may include any number of Node-Bs and RNCs while remaining consistent with an embodiment.

As shown in FIG. 10C, the Node-Bs 1040a, 1040b may be in communication with the RNC 1042a. Additionally, the Node-B 1040c may be in communication with the RNC 1042b. The Node-Bs 1040a, 1040b, 1040c may communicate with the respective RNCs 1042a, 1042b via an Iub interface. The RNCs 1042a, 1042b may be in communication with one another via an Iur interface. Each of the RNCs 1042a, 1042b may be configured to control the respective Node-Bs 1040a, 1040b, 1040c to which it is connected. In addition, each of the RNCs 1042a, 1042b may be configured to carry out or support other functionality, such as outer loop power control, load control, admission control, packet scheduling, handover control, macrodiversity, security functions, data encryption, and the like.

The core network 1006 shown in FIG. 10C may include a media gateway (MGW) 1044, a mobile switching center (MSC) 1046, a serving GPRS support node (SGSN) 1048, and/or a gateway GPRS support node (GGSN) 1050. While each of the foregoing elements are depicted as part of the core network 1006, it will be appreciated that any one of these elements may be owned and/or operated by an entity other than the core network operator.

The RNC 1042a in the RAN 1003 may be connected to the MSC 1046 in the core network 1006 via an IuCS interface. The MSC 1046 may be connected to the MGW 1044. The MSC 1046 and the MGW 1044 may provide the WTRUs 1002a, 1002b, 1002c with access to circuit-switched networks, such as the PSTN 1008, to facilitate communications between the WTRUs 1002a, 1002b, 1002c and traditional land-line communications devices.

The RNC 1042a in the RAN 1003 may also be connected to the SGSN 1048 in the core network 1006 via an IuPS interface. The SGSN 1048 may be connected to the GGSN 1050. The SGSN 1048 and the GGSN 1050 may provide the WTRUs 1002a, 1002b, 1002c with access to packet-switched networks, such as the Internet 1010, to facilitate communications between and the WTRUs 1002a, 1002b, 1002c and IP-enabled devices.

As noted above, the core network 1006 may also be connected to the networks 1012, which may include other wired or wireless networks that are owned and/or operated by other service providers.

Figure 10D:
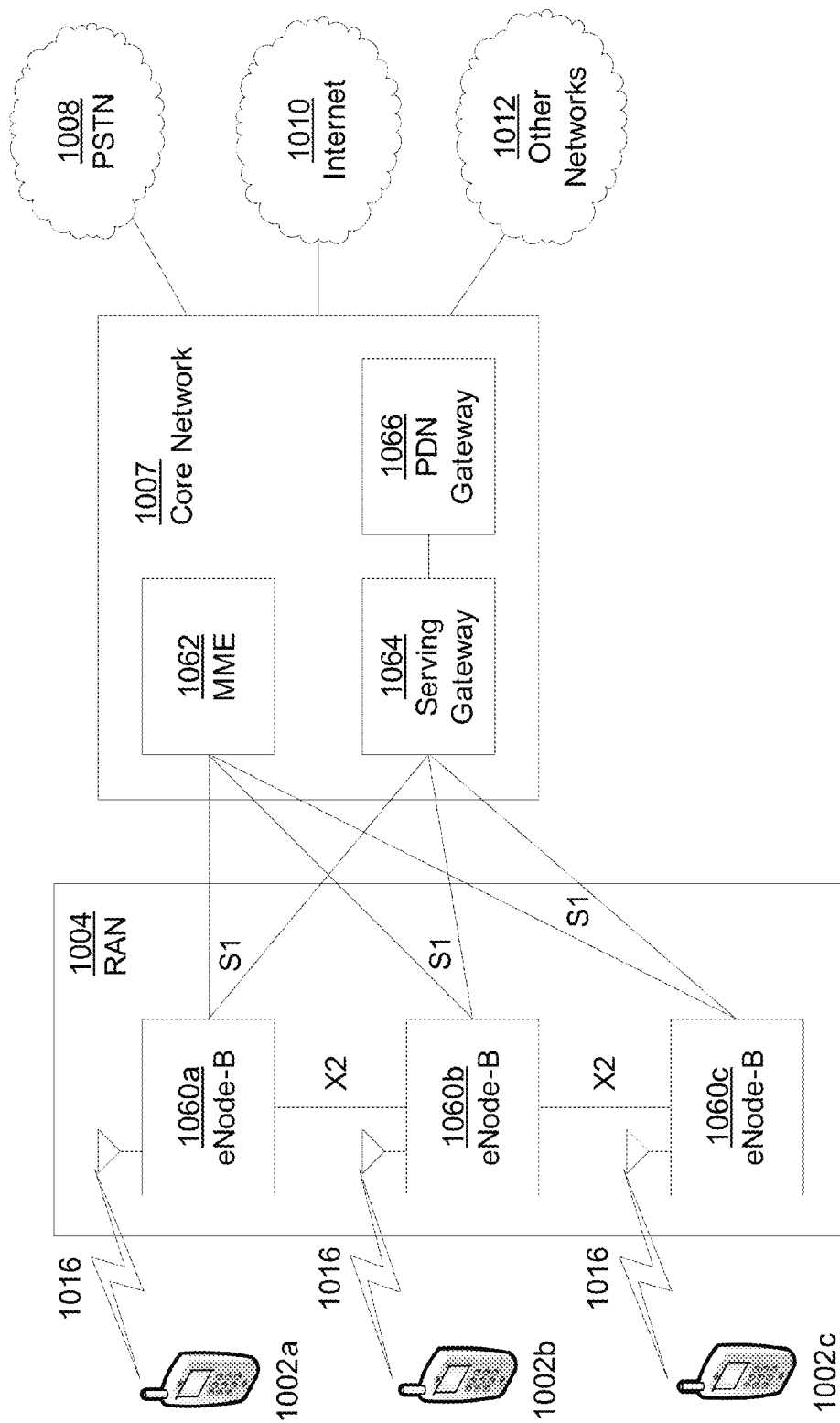
FIG. 10D is a system diagram of another example radio access network and another example core network that may be used within the communications system illustrated in FIG. 10A.

FIG. 10D is a system diagram of the RAN 1004 and the core network 1007 according to an embodiment. As noted above, the RAN 1004 may employ an E-UTRA radio technology to communicate with the WTRUs 1002a, 1002b, 1002c over the air interface 1016. The RAN 1004 may also be in communication with the core network 1007.

The RAN 1004 may include eNode-Bs 1060a, 1060b, 1060c, though it will be appreciated that the RAN 1004 may include any number of eNode-Bs while remaining consistent with an embodiment. The eNode-Bs 1060a, 1060b, 1060c may each include one or more transceivers for communicating with the WTRUs 1002a, 1002b, 1002c over the air interface 1016. In one embodiment, the eNode-Bs 1060a, 1060b, 1060c may implement MIMO technology. Thus, the eNode-B 1060a, for example, may use multiple antennas to transmit wireless signals to, and receive wireless signals from, the WTRU 1002a.

Each of the eNode-Bs 1060a, 1060b, 1060c may be associated with a particular cell (not shown) and may be configured to handle radio resource management decisions, handover decisions, scheduling of users in the uplink and/or downlink, and the like. As shown in FIG. 10D, the eNode-Bs 1060a, 1060b, 1060c may communicate with one another over an X2 interface.

The core network 1007 shown in FIG. 10D may include a mobility management gateway (MME) 1062, a serving gateway 1064, and a packet data network (PDN) gateway 1066. While each of the foregoing elements are depicted as part of the core network 1007, it will be appreciated that any one of these elements may be owned and/or operated by an entity other than the core network operator.

The MME 1062 may be connected to each of the eNode-Bs 1060a, 1060b, 1060c in the RAN 1004 via an S1 interface and may serve as a control node. For example, the MME 1062 may be responsible for authenticating users of the WTRUs 1002a, 1002b, 1002c, bearer activation/deactivation, selecting a particular serving gateway during an initial attach of the WTRUs 1002a, 1002b, 1002c, and the like. The MME 1062 may also provide a control plane function for switching between the RAN 1004 and other RANs (not shown) that employ other radio technologies, such as GSM or WCDMA.

The serving gateway 1064 may be connected to each of the eNode Bs 1060a, 1060b, 1060c in the RAN 1004 via the S1 interface. The serving gateway 1064 may generally route and forward user data packets to/from the WTRUs 1002a, 1002b, 1002c. The serving gateway 1064 may also perform other functions, such as anchoring user planes during inter-eNode B handovers, triggering paging when downlink data is available for the WTRUs 1002a, 1002b, 1002c, managing and storing contexts of the WTRUs 1002a, 1002b, 1002c, and the like.

The serving gateway 1064 may also be connected to the PDN gateway 1066, which may provide the WTRUs 1002a, 1002b, 1002c with access to packet-switched networks, such as the Internet 1010, to facilitate communications between the WTRUs 1002a, 1002b, 1002c and IP-enabled devices.

The core network 1007 may facilitate communications with other networks. For example, the core network 1007 may provide the WTRUs 1002a, 1002b, 1002c with access to circuit-switched networks, such as the PSTN 1008, to facilitate communications between the WTRUs 1002a, 1002b, 1002c and traditional land-line communications devices. For example, the core network 1007 may include, or may communicate with, an IP gateway (e.g., an IP multimedia subsystem (IMS) server) that serves as an interface between the core network 1007 and the PSTN 1008. In addition, the core network 1007 may provide the WTRUs 1002a, 1002b, 1002c with access to the networks 1012, which may include other wired or wireless networks that are owned and/or operated by other service providers.

Figure 10E:
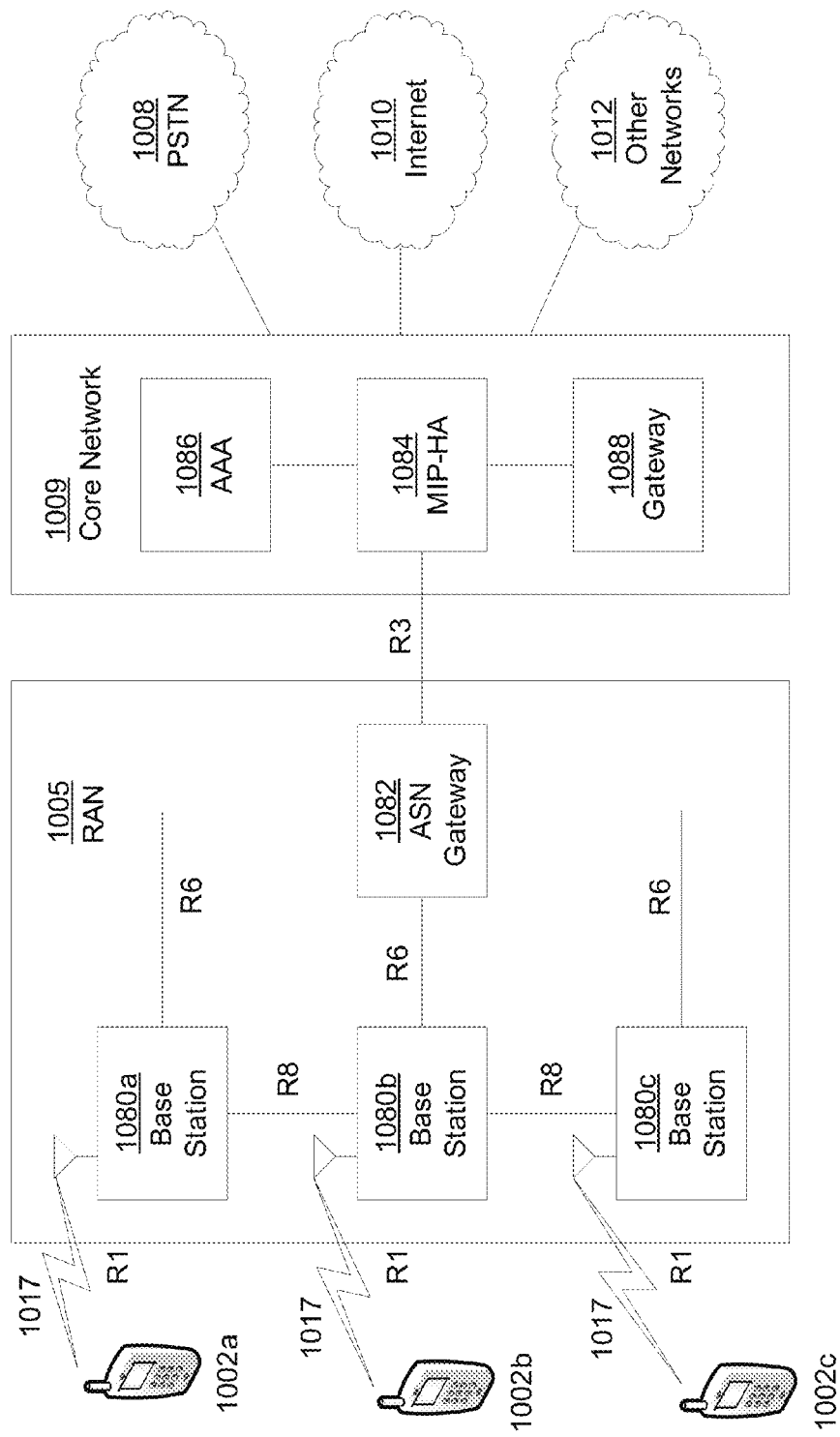
FIG. 10E is a system diagram of another example radio access network and another example core network that may be used within the communications system illustrated in FIG. 10A.

FIG. 10E is a system diagram of the RAN 1005 and the core network 1009 according to an embodiment. The RAN 1005 may be an access service network (ASN) that employs IEEE 802.16 radio technology to communicate with the WTRUs 1002a, 1002b, 1002c over the air interface 1016. As will be further discussed below, the communication links between the different functional entities of the WTRUs 1002a, 1002b, 1002c, the RAN 1005, and the core network 1009 may be defined as reference points.

As shown in FIG. 10E, the RAN 1005 may include base stations 1080a, 1080b, 1080c, and an ASN gateway 1082, though it will be appreciated that the RAN 1005 may include any number of base stations and ASN gateways while remaining consistent with an embodiment. The base stations 1080a, 1080b, 1080c may each be associated with a particular cell (not shown) in the RAN 1005 and may each include one or more transceivers for communicating with the WTRUs 1002a, 1002b, 1002c over the air interface 1017. In one embodiment, the base stations 1080a, 1080b, 1080c may implement MIMO technology. Thus, the base station 1080a, for example, may use multiple antennas to transmit wireless signals to, and receive wireless signals from, the WTRU 1002a. The base stations 1080a, 1080b, 1080c may also provide mobility management functions, such as handoff triggering, tunnel establishment, radio resource management, traffic classification, quality of service (QoS) policy enforcement, and the like. The ASN gateway 1082 may serve as a traffic aggregation point and may be responsible for paging, caching of subscriber profiles, routing to the core network 1009, and the like.

The air interface 1017 between the WTRUs 1002a, 1002b, 1002c and the RAN 1005 may be defined as an R1 reference point that implements the IEEE 802.16 specification. In addition, each of the WTRUs 1002a, 1002b, 1002c may establish a logical interface (not shown) with the core network 1009. The logical interface between the WTRUs 1002a, 1002b, 1002c and the core network 1009 may be defined as an R2 reference point, which may be used for authentication, authorization, IP host configuration management, and/or mobility management.

The communication link between each of the base stations 1080a, 1080b, 1080c may be defined as an R8 reference point that includes protocols for facilitating WTRU handovers and the transfer of data between base stations. The communication link between the base stations 1080a, 1080b, 1080c and the ASN gateway 1082 may be defined as an R6 reference point. The R6 reference point may include protocols for facilitating mobility management based on mobility events associated with each of the WTRUs 1002a, 1002b, 1002c.

As shown in FIG. 10E, the RAN 1005 may be connected to the core network 1009. The communication link between the RAN 1005 and the core network 1009 may defined as an R3 reference point that includes protocols for facilitating data transfer and mobility management capabilities, for example. The core network 1009 may include a mobile IP home agent (MIP-HA) 1084, an authentication, authorization, accounting (AAA) server 1086, and a gateway 1088. While each of the foregoing elements are depicted as part of the core network 1009, it will be appreciated that any one of these elements may be owned and/or operated by an entity other than the core network operator.

The MIP-HA may be responsible for IP address management, and may enable the WTRUs 1002a, 1002b, 1002c to roam between different ASNs and/or different core networks. The MIP-HA 1084 may provide the WTRUs 1002a, 1002b, 1002c with access to packet-switched networks, such as the Internet 1010, to facilitate communications between the WTRUs 1002a, 1002b, 1002c and IP-enabled devices. The AAA server 1086 may be responsible for user authentication and for supporting user services. The gateway 1088 may facilitate interworking with other networks. For example, the gateway 1088 may provide the WTRUs 1002a, 1002b, 1002c with access to circuit-switched networks, such as the PSTN 1008, to facilitate communications between the WTRUs 1002a, 1002b, 1002c and traditional land-line communications devices. In addition, the gateway 1088 may provide the WTRUs 1002a, 1002b, 1002c with access to the networks 1012, which may include other wired or wireless networks that are owned and/or operated by other service providers.

Although not shown in FIG. 10E, it will be appreciated that the RAN 1005 may be connected to other ASNs and the core network 1009 may be connected to other core networks. The communication link between the RAN 1005 the other ASNs may be defined as an R4 reference point, which may include protocols for coordinating the mobility of the WTRUs 1002a, 1002b, 1002c between the RAN 1005 and the other ASNs. The communication link between the core network 1009 and the other core networks may be defined as an R5 reference, which may include protocols for facilitating interworking between home core networks and visited core networks.

The processes described above may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
receiving a video signal;
determining encoding statistics related to the video signal during a first encoding pass using one or more reference picture lists;
reordering, prior to a second encoding pass, pictures in the one or more reference picture lists based on the encoding statistics determined from the first encoding pass, wherein the encoding statistics comprise motion-compensated distortion information such that the pictures with smaller motion-compensated distortion are assigned lower indices in the one or more reference picture lists; and
encoding the video signal during the second encoding pass using the one or more reordered reference picture lists.

2. The method of claim 1, further comprising:
encoding the video signal during the first encoding pass using the one or more reference picture lists;
comparing a video bitstream generated during the first encoding pass to a video bitstream generated during the second encoding pass; and
sending the video bitstream that is characterized by a lower Lagrangian rate-distortion (RD) cost.

3. The method of claim 1, wherein the encoding statistics further comprise reference usage information, and wherein the pictures in the one or more reference picture lists are reordered such that the pictures with higher usage frequency are assigned lower indices.

4. The method of claim 3, wherein the reference usage information is based on a number of smallest prediction units (SPUs) in an encoded picture or slice that refer to a reference picture.

5. The method of claim 1, wherein the motion-compensated distortion information is determined based on one or more of sum of square error (SSE), sum of absolute difference (SAD), or sum of absolute transformed differences (SATD).

6. The method of claim 1, wherein the motion-compensated distortion information is determined based on motion-compensated distortion of smallest prediction units (SPUs) and prediction blocks of the pictures in the one or more reference picture lists.

7. The method of claim 1, wherein one or more of the first encoding pass and the second encoding pass comprise a complete encoding pass of the video signal.

8. The method of claim 1, wherein the pictures in the one or more reference picture lists that are reordered comprise at least one of temporal reference pictures or inter-layer reference pictures.

9. The method of claim 1, further comprising:
performing one or more encoding passes after the first encoding pass and before the second encoding pass.

10. An encoder comprising:
a processor configured to:
receive a video signal;
determine encoding statistics related to the video signal during a first encoding pass using one or more reference picture lists;
reorder, prior to a second encoding pass, pictures in the one or more reference picture lists based on the encoding statistics determined from the first encoding pass, wherein the encoding statistics comprise motion-compensated distortion information such that the pictures with smaller motion-compensated distortion are assigned lower indices in the one or more reference picture lists; and
encode the video signal during the second encoding pass using the one or more reordered reference picture lists.

11. The encoder of claim 10, wherein the processor is further configured to:
encode the video signal during the first encoding pass using the one or more reference picture lists;
compare a video bitstream generated during the first encoding pass to a video bitstream generated during the second encoding pass; and
send the video bitstream that is characterized by a lower Lagrangian rate-distortion (RD) cost.

12. The encoder of claim 10, wherein the encoding statistics further comprise reference usage information, and wherein the pictures in the one or more reference picture lists are reordered such that the pictures with higher usage frequency are assigned lower indices.

13. The encoder of claim 12, wherein the reference usage information is based on a number of smallest prediction units (SPUs) in an encoded picture or slice that refer to a reference picture.

14. The encoder of claim 10, wherein the motion-compensated distortion information is determined based on one or more of sum of square error (SSE), sum of absolute difference (SAD), or sum of absolute transformed differences (SATD).

15. The encoder of claim 10, wherein the motion-compensated distortion information is determined based on motion-compensated distortion of smallest prediction units (SPUs) and prediction blocks of the pictures in the one or more reference picture lists.

16. The encoder of claim 10, wherein one or more of the first encoding pass and the second encoding pass comprise a complete encoding pass of the video signal.

17. The encoder of claim 10, wherein the pictures in the one or more reference picture lists that are reordered comprise at least one of temporal reference pictures or inter-layer reference pictures.

18. The encoder of claim 10, wherein the encoder is further configured to perform one or more encoding passes after the first encoding pass and before the second encoding pass.

* * * * *